United States Patent
Willis

(10) Patent No.: US 10,239,786 B2
(45) Date of Patent: Mar. 26, 2019

(54) GEOPOLYMERS AND GEOPOLYMER AGGREGATES

(71) Applicant: POLYAGG PTY LTD, Beaconsfield, Victoria (AU)

(72) Inventor: Nicholas John Willis, Beaumaris (AU)

(73) Assignee: POLYAGG PTY LTD, Beaconsfield, Victoria (AU)

( * ) Notice: Subject to any disclaimer, the term of this patent is extended or adjusted under 35 U.S.C. 154(b) by 45 days.

(21) Appl. No.: 15/326,548

(22) PCT Filed: Aug. 13, 2015

(86) PCT No.: PCT/AU2015/000488
§ 371 (c)(1),
(2) Date: Jan. 16, 2017

(87) PCT Pub. No.: WO2016/023073
PCT Pub. Date: Feb. 18, 2016

(65) Prior Publication Data
US 2017/0204008 A1    Jul. 20, 2017

(30) Foreign Application Priority Data

Aug. 13, 2014 (AU) ................................ 2014903166

(51) Int. Cl.
| | | |
|---|---|---|
| *C04B 18/02* | (2006.01) | |
| *C04B 18/08* | (2006.01) | |
| *C04B 12/00* | (2006.01) | |
| *C04B 20/02* | (2006.01) | |
| *C04B 28/00* | (2006.01) | |

(52) U.S. Cl.
CPC .......... *C04B 18/021* (2013.01); *C04B 12/005* (2013.01); *C04B 18/027* (2013.01); *C04B 18/08* (2013.01); *C04B 20/026* (2013.01); *C04B 28/006* (2013.01); *Y02P 40/165* (2015.11); *Y02W 30/92* (2015.05)

(58) Field of Classification Search
CPC ..... C04B 18/021; C04B 18/027; C04B 18/08; C04B 12/005; C04B 20/026; C04B 28/006

See application file for complete search history.

(56) References Cited

U.S. PATENT DOCUMENTS

| 5,372,640 A | 12/1994 | Schwarz et al. |
| 2011/0290153 A1 | 12/2011 | Abdullah et al. |
| 2012/0152153 A1* | 6/2012 | Gong .................... C04B 28/006 106/705 |
| 2014/0264140 A1* | 9/2014 | Gong .................... C04B 28/006 252/62 |

FOREIGN PATENT DOCUMENTS

| CA | 2871424 | 10/2013 | |
| KR | 10-2012-0044014 A | * 5/2012 | |
| WO | 2005019130 | 3/2005 | |
| WO | WO-2010130582 A2 | * 11/2010 | ............... C04B 7/24 |

OTHER PUBLICATIONS

International Search Report and Written Opinion for Application No. PCT/AU2015/000488 dated Sep. 29, 2015 (10 pages).
International Preliminary Report on Patentability for Application No. PCT/AU2015/000488 dated Sep. 16, 2016 (27 pages).
Australian Patent Office International-Type Search Report for Application No. 2014903166 dated Jul. 7, 2015, 7 pages.
Astutiningsih et al., 'Durability of Geopolymer Concrete upon Seawater Exposure' Advances in Science and Technology, 2010, vol. 69, pp. 92-96.

* cited by examiner

*Primary Examiner* — Anthony J Green
(74) *Attorney, Agent, or Firm* — Michael Best & Friedrich LLP

(57) ABSTRACT

The invention relates to geopolymer compositions, geopolymers and methods for their production and use. The geopolymers may be used as aggregates, and those aggregates may be used in concrete manufacture. The geopolymer composition comprises fly ash or a fly ash substitute, an aluminum phyllosilicate, an alkaline component and water, wherein the water is present at an amount of about 6% to about 10% by weight of the composition. The geopolymers are made by forming a geopolymer composition as described above, compacting the mixture by applying pressure of about 50 to about 90 kgf/cm$^2$; and curing the compacted mixture to form the geopolymer.

30 Claims, 3 Drawing Sheets

GEOPOLYMERS AND GEOPOLYMER AGGREGATES

FIELD

The invention relates generally to geopolymers, such as geopolymer aggregates and aggregate compositions. The geopolymers may be fly ash-containing geopolymers. The invention also relates to articles comprising the geopolymer, including articles comprising a geopolymer aggregate, the use of a geopolymer aggregate in concrete and concrete comprising a geopolymer aggregate. The invention also relates to methods of producing a geopolymer such as a geopolymer aggregate.

BACKGROUND

Concrete is one of the oldest known building materials. It is made from mixed aggregates, such as crushed rock or stone and sand, combined with cement and water. The components of concrete can be mixed in varying proportions which give concrete many different applications, for example, structural applications such as pavements and building panels to decorative applications.

Coarse aggregate, such as crushed rock or stone, forms up to 65% of the volume of concrete. The compressive strength of the aggregate is an important factor in the selection of aggregate for concrete. Specifically, it is essential that the aggregate has a high compressive strength and in particular, the aggregate must have a high compressive strength when wet. This is because concrete is made with water and preferably maintained wet during its curing. A low aggregate compressive strength when wet will lead to weakening of the concrete before the concrete has even set. Furthermore, most applications of concrete will result in the concrete getting wet, for example, buildings, pavements and bridges are all subject to rain. Therefore, using aggregate with a low compressive strength when wet will lead to weak concrete which will not be structurally sound.

Unfortunately, coarse aggregate for concrete is a diminishing resource and there is a large cost in terms of energy, financials and the environment in quarrying coarse aggregate suitable for concrete from the ground.

There therefore exists a need for alternative aggregates suitable for use in concrete, and compositions suitable for the production of aggregates. There is also a need for new types of geopolymers more generally, which can be used in a range of applications, including the formation of aggregate suitable for use in concrete, and the formation of entire structural elements from the geopolymer, including tiles, benchtops, and replacement pre-formed stone-like materials.

It has been proposed previously to produce new forms of concrete which contain a geopolymer binder in place of normal cement (such as Portland cement). Such concrete compositions additionally contain crushed rock and/or stone as the aggregate component, which is to be contrasted to the use of new geopolymer compositions for forming a substitute aggregate (stone-like) material itself. Geopolymer compositions have also been proposed for use as mortar pastes for gap filling, however such compositions do not contain the properties of the geopolymers described herein. Further, in the context of the preparation of geopolymer aggregate (stone-like) materials, such mortar paste compositions are distinctly different to the compositions, materials and methods that are the subject of the present application.

SUMMARY

Accordingly, in a first aspect, there is provided a geopolymer composition comprising fly ash or a fly ash substitute, an aluminium phyllosilicate, an alkaline component and water, wherein the water is present at an amount of about 6% to about 10% by weight of the composition.

In one embodiment the geopolymer composition is geopolymer aggregate composition, comprising fly ash or a fly ash substitute, an aluminium phyllosilicate, an alkaline component and water, wherein the water is present at an amount of about 6% to about 10% by weight of the composition. In another embodiment, the geopolymer aggregate composition comprises fly ash, an aluminium phyllosilicate, an alkaline component and water, wherein the water is present at an amount of about 6% to about 10% by weight of the composition.

The geopolymer aggregate composition is used to form a geopolymer aggregate by pressing (i.e. compacting) and curing the geopolymer aggregate composition. Similarly, the geopolymer composition is used to form a geopolymer by compacting and curing the composition.

The term "geopolymer aggregate composition" is used herein to refer to the geopolymer aggregate composition in its raw (uncured) state. The geopolymer aggregate composition in this state is in a flowable powder form. The powder is slightly more damp than the input fly ash (or fly ash substitute) and aluminium phyllosilicate components, and has the texture of very fine, sparingly damp sand. The geopolymer aggregate composition at this time is not in the form of a solid compacted product. The term "geopolymer aggregate" (without the qualifier "composition") is used to refer to the compacted and cured aggregate product formed from the geopolymer aggregate composition. Similarly, a "geopolymer composition" refers to the mixture of fly ash or a fly ash substitute, an aluminium phyllosilicate, an alkaline component and water in its raw, uncured state, which may then be used in the formation of a geopolymer through compacting and curing. The geopolymer composition in this state is in a flowable powder form, and has the texture of sparingly damp, very fine sand. This geopolymer composition or mixture may then be compacted into a compacted mixture, and then cured to form the geopolymer.

Geopolymer aggregate composition and geopolymer aggregate may respectively be referred to as "aggregate composition" and "aggregate".

The present applicant has conducted considerable research and development over an extensive period of time to develop an aggregate which has good compressive strength when wet and dry making it a suitable substitute for traditional crushed rock or stone in concrete. The applicant has developed this aggregate to contain fly ash which is a waste product from coal power stations. Fly ash is typically dumped in landfill as solid waste and its production is therefore a major environmental issue. The use of fly ash in an aggregate will significantly reduce the amount of fly ash dumped in landfill and also makes the aggregate lightweight which will result in reduced handling and transport costs. Whilst fly ash is the preferred silicon source for the geopolymer aggregate, it is possible to use a fly ash substitute such as silica in the geopolymer composition.

It is noted that the production of a replacement aggregate material for traditional crushed rock and/or stone is not a simple matter, particularly when that material is to be produced in the absence of cement or other like strengthening agents. In this sense, the composition is a "straight" geopolymer composition. That is, aggregate consists of geopolymer, or consists essentially of geopolymer. The production of this aggregate material is made possible through the careful development of the correct components in the composition, the controlled water content and correct processing conditions. Other factors that contribute to the compressive strength of the geopolymer aggregate (stone) material produced from the composition are described in the detailed description and Examples below.

It will be understood that, as the geopolymer aggregate composition is used to form aggregate (i.e. a substitute for crushed rock or stone), the geopolymer aggregate composition is typically substantially free of natural crushed rock or stone. The composition is also preferably substantially free of natural sand. The presence of crushed rock or stone in the geopolymer aggregate composition at a typical particle size that is used in aggregates included in concrete compositions impedes the ability to form an aggregate from the geopolymer aggregate composition. That is, having rock or stone pieces in the geopolymer aggregate composition that are already of a size corresponding to that of the aggregate to be made from the aggregate composition prevents the formation of cured geopolymer aggregate pieces in the required size from the uncured composition. In this context, it is noted that "natural" refers to rock, stone and/or sand that are from natural sources, and thus excludes the present described synthetic or geopolymer rock, stone, aggregate or sand substitutes.

"Substantially free" refers to the absence of any significant amount of crushed rock or stone (or sand). Preferably, the geopolymer aggregate composition is free of crushed rock or stone. Whilst that is the case, it is appreciated that the addition of small amounts of crushed rock, stone or sand in the geopolymer aggregate composition is within the scope of the present application. Where present, the crushed rock or stone pieces should be much finer than the aggregate piece size that is to be produced from the aggregate composition. The amount may be up to 10% by weight, or alternately up to 9%, up to 8%, up to 7%, up to 6%, up to 5%, up to 4%, up to 3%, up to 2% or up to 1% by weight of the geopolymer aggregate composition. The amount may be up to 10% by volume, or alternately up to 9%, up to 8%, up to 7%, up to 6%, up to 5%, up to 4%, up to 3%, up to 2% or up to 1% by volume of the geopolymer aggregate composition. These amounts correspond to various degrees of the composition being "substantially free" of the crushed rock/stone component.

Whilst aggregates are a focus of embodiments of the present invention, it is appreciated that the geopolymer formed from the mixture described herein, and formed through the method described herein, could be produced in different forms, and can be used in other applications. Thus, as examples, the geopolymer itself can be formed into entire structural elements, including tiles, benchtops, building elements, sheeting, slabs and replacement pre-formed stone-like materials. In these embodiments, the materials formed may be formed entirely from the geopolymer, without any natural rock or stone components. For simplicity, the present invention is described herein with reference to the context of the production of geopolymer aggregate. However, it will be understood that the invention potentially has broader application, and such references to aggregate production should only be read as limiting if required in the context.

According to a second aspect, there is provided a geopolymer produced from the geopolymer composition described above. In one embodiment, the geopolymer is a geopolymer aggregate, and the geopolymer aggregate is produced from the geopolymer aggregate composition described above. There is also provided a geopolymer producible from the geopolymer composition described above, such as a geopolymer aggregate producible from the geopolymer aggregate composition described above.

Thus, in one embodiment of the second aspect, there is provided a geopolymer comprising a cured, compacted combination of fly ash or fly ash substitute, an aluminium phyllosilicate, an alkaline component and water, wherein the water constituted 6% to 10% of the combination prior to curing. In one embodiment, there is provided a geopolymer aggregate comprising pieces of a cured compacted combination of fly ash or fly ash substitute, an aluminium phyllosilicate, an alkaline component and water, wherein the water is present at an amount of about 6% to about 10% by weight of the composition prior to curing.

According to a third aspect, there is provided the use of the geopolymer aggregate composition described above to produce a geopolymer aggregate.

In one embodiment of the second and third aspects, the geopolymer, or the geopolymer aggregate, does not comprise cement. In another embodiment the geopolymer or the geopolymer aggregate may be substantially free of cement.

According to a fourth aspect, there is provided use of the geopolymer aggregate described above as a component of concrete.

According to a fifth aspect, there is provided an article comprising the geopolymer aggregate described above. In one embodiment, the article is concrete. Accordingly, there is also provided concrete comprising the geopolymer aggregate described above. As above, the concrete is preferably substantially free of crushed rock and/or stone.

According to a sixth aspect, there is provided an article comprising the geopolymer described above. In one embodiment, the article consists of the geopolymer described above. In another embodiment, the article comprises the geopolymer described above, and no cement.

According to a seventh aspect, there is provided a method of producing a geopolymer comprising:
  i) combining fly ash or fly ash substitute, an aluminium phyllosilicate, an alkaline component and water to form a mixture, wherein the water is present in an amount of about 6% to about 10% by weight of the mixture;
  ii) compacting the mixture by applying pressure; and
  iii) curing the compacted mixture to form the geopolymer.

The method may comprise compacting the mixture to form a compacted mass, curing the mass to form a geopolymer mass, and breaking the geopolymer mass into geopolymer pieces. Breaking can be by way of crushing.

The method may comprise compacting the mixture to form compacted pieces, and curing the pieces to form geopolymer aggregate.

Following from this, in one embodiment of the seventh aspect, there is provided a method of producing a geopolymer aggregate comprising:
  i) forming fly ash, an aluminium phyllosilicate, an alkaline component and water into an aggregate composition, wherein the water is present at an amount of about 6% to about 10% by weight of the aggregate composition;
  ii) applying a pressure to the aggregate composition to form an aggregate; and
  iii) curing the aggregate.

The aggregate so formed is typically a stone-like substance. The fly ash may be substituted with a fly ash substitute, as described herein.

The applicant has found that, by using the specified composition, and applying pressure to the composition during the production of the aggregate, the aggregate so produced has excellent properties, as demonstrated in the Examples below.

In one embodiment, the pressure applied to the aggregate composition in the compacting step is about 50 to about 90 kgf/cm².

According to an eighth aspect, there is provided a method of producing a geopolymer comprising:
- iv) combining fly ash or fly ash substitute, an aluminium phyllosilicate, an alkaline component and water to form a mixture;
- v) compacting the mixture by applying pressure of about 50 to about 90 kgf/cm²; and
- vi) curing the compacted mixture to form the geopolymer.

In one embodiment of the eighth aspect, the method of producing a geopolymer aggregate comprises:
- i) forming fly ash, an aluminium phyllosilicate, an alkaline component and water into an aggregate composition;
- ii) applying a pressure of about 50 to about 90 kgf/cm² to the aggregate composition to form an aggregate; and
- iii) curing the aggregate.

According to a ninth aspect, there is provided a geopolymer aggregate produced by the method described above.

These aspects are described more fully in the detailed description below.

DETAILED DESCRIPTION

Figure 1:
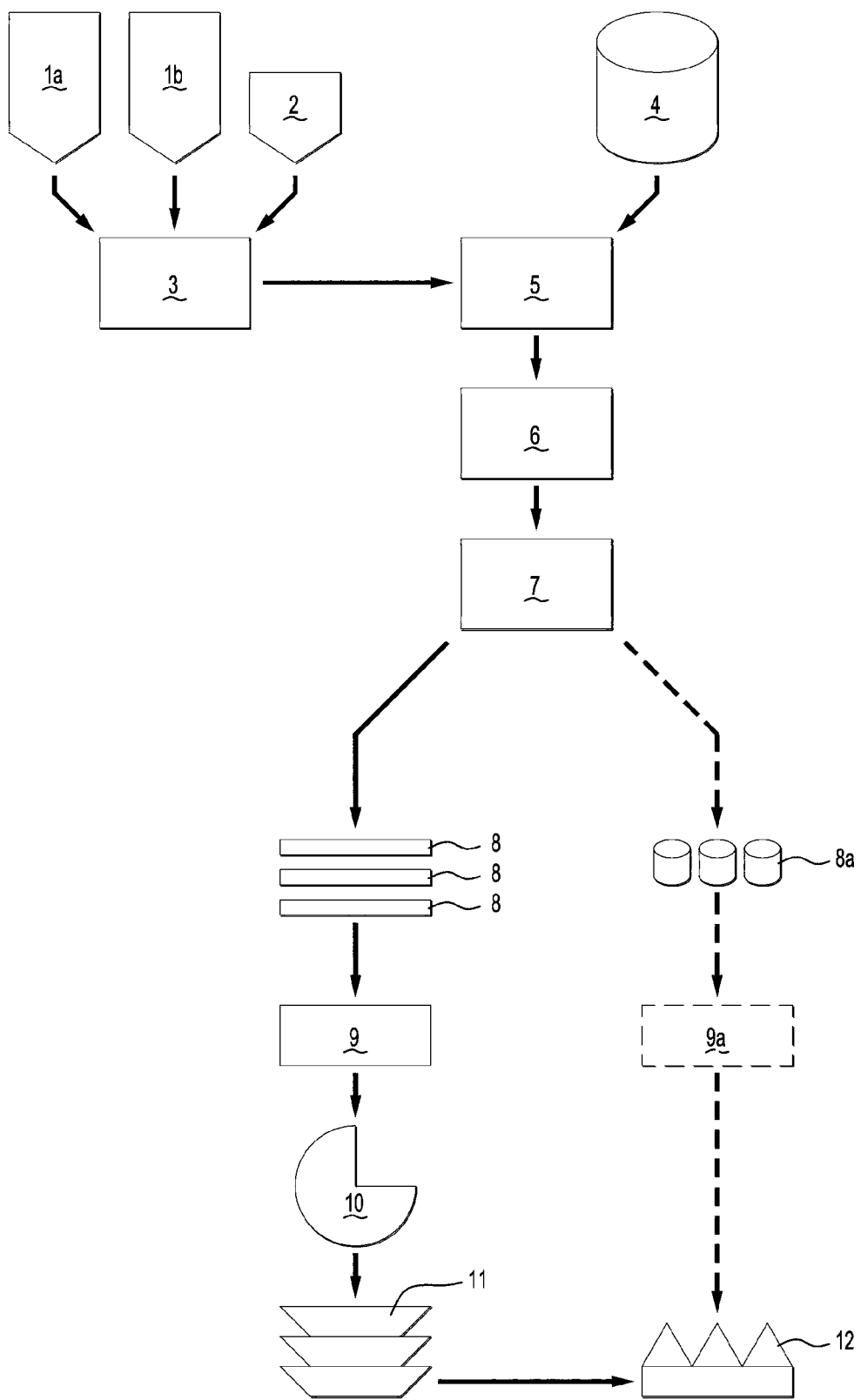
FIG. 1 is a schematic diagram showing the steps involved in the manufacture of a geopolymer aggregate in accordance with one embodiment of the invention.

The invention relates generally to geopolymers, geopolymer aggregates and aggregate compositions. These may be fly ash containing geopolymers, geopolymer aggregates and aggregate compositions. The invention also relates to an article comprising a geopolymer or geopolymer aggregate, the use of a geopolymer aggregate in concrete and concrete comprising a geopolymer aggregate. The invention also relates to methods of producing a geopolymer, which may be in the form of a geopolymer aggregate.

In the following, we have described features of the aggregate composition, the aggregate produced from the composition, concrete comprising the aggregate and the methods for producing the aggregate. All features described below apply independently to the methods and the products of the invention. Further, the invention may be applied more broadly to the formation of geopolymers, and the following should be read in that light, unless the contrary intention is clearly expressed.

When ranges of amounts of components in the aggregate composition are provided below, it will be appreciated that the total percentage of all components present in the aggregate composition cannot exceed 100%.

Unless indicated otherwise, any percentage referred to herein refers to weight percent.

Geopolymer Aggregate Composition

In one aspect, there is provided a geopolymer aggregate composition comprising fly ash, an aluminium phyllosilicate, an alkaline component and water, wherein the water is present at an amount of about 6% to about 10% by weight of the composition. As described in further detail below, fly ash substitute may be used in place of the fly ash, however in some embodiments, it is preferred to use fly ash itself in the mixture or composition.

In addition to the water content, the geopolymer aggregate composition of preferred embodiments of the invention contains a balance of a range of features. Although water content is an important feature, it is noted that a range of other features contribute to the development of the optimal aggregate (or geopolymer more generally) having a range of desired properties. Preferred embodiments of the invention contain a combination of features, including the required water content and other features, such as particle size of powder ingredients, hydroxyl ion content, alkali concentration, ratio of Si:Al, timing of the manufacturing steps, compression force, curing temperature and/or curing time.

Water

The aggregate composition comprises water. The water may be in the form of a solution of the alkaline component. Alternatively, the water may be independent of the alkaline component.

The present applicant has found that the amount of water in the aggregate composition is very important, especially in providing good wet compressive strength of the resulting aggregate. The present applicant has surprisingly found that having too much water in the aggregate composition leads to a detrimental effect on the compressive strength of the aggregate, in particular the wet compressive strength.

The present applicant has conducted significant experimentation to determine the optimum amount of water in the aggregate composition. In the experimental work, kaolin was used as the aluminium phyllosilicate and sodium hydroxide was used as the alkaline component. The composition is cement-free.

In one experiment, four batches of aggregates (pellets) were prepared with varying water contents and the following compositions:

| Batch Number | % Fly ash | % Kaolin | % NaOH | % Water | Form of NaOH/water | Si:Al ratio |
| --- | --- | --- | --- | --- | --- | --- |
| 1 | 67.3 | 4.7 | 7.0 | 21.0 | 25% w/w aqueous solution | 4.81 |
| 2 | 67.3 | 4.7 | 7.0 | 21.0 | 25% powder and free water | 4.81 |
| 3 | 80.4 | 5.6 | 7.0 | 7.0 | 50% w/w aqueous solution | 4.81 |
| 4 | 80.4 | 5.6 | 7.0 | 7.0 | 50% powder and free water | 4.81 |

Three pellets were made for each batch. All pellets were subjected to a pressure of 6000 kPa before being cured in an oven for 60 minutes at 100° C. The dry compressive strength of one pellet for each batch was assessed. The second pellet for each batch was immersed in water for 5 days and its wet compressive strength assessed. The third pellet for each batch was immersed in water for 27 days and its wet compressive strength assessed. The results for each batch are shown below:

| Batch 1 - 25% (w/w) aqueous solution | | | | |
|---|---|---|---|---|
| Pellet Number | | 1 | 2 | 3 |
| Pressure applied | kPa | 6000 | 6000 | 6000 |
| Time in Oven | mins | 60 | 60 | 60 |
| Oven temp | deg C. | 100 | 100 | 100 |
| Pellet Diameter | mm | 20.0 | 20.0 | 20.0 |
| Pellet Thickness (height) | mm | 10.25 | 10.27 | 10.70 |
| OD Weight of Pellet | gm | 5.13 | 5.11 | 5.25 |
| Density of Cured Stone | gm/cc | 1.59 | 1.58 | 1.56 |
| Compressive Strength - DRY | mPa | 20 | | |
| Immersion time | days | | 5 | 27 |
| Compressive Strength - WET | mPa | | 9 | 7 |

The pellet of batch 1 each showed excellent dry compressive strength of 20 mPa. However, the wet compressive strengths for pellets reduced to 9 mPa after immersion for 5 days and 7 mPa after immersion for 27 days.

| Batch 2 - 25% powder and free water | | | | |
|---|---|---|---|---|
| Pellet Number | | 4 | 5 | 6 |
| Pressure applied | kPa | 6000 | 6000 | 6000 |
| Time in Oven | mins | 60 | 60 | 60 |
| Oven temp | deg C. | 100 | 100 | 100 |
| Pellet Diameter | mm | 20.0 | 20.0 | 20.0 |
| Pellet Thickness (height) | mm | 10.25 | 10.30 | 10.65 |
| OD Weight of Pellet | gm | 5.12 | 5.07 | 5.19 |
| Density of Cured Stone | gm/cc | 1.59 | 1.57 | 1.55 |
| Compressive Strength - DRY | mPa | 18 | | |
| Immersion time | days | | 5 | 27 |
| Compressive Strength - WET | mPa | | 14 | 10 |

The pellets of batch 2 each showed a dry compressive strength of 18 mPa and a wet compressive strength of 14 mPa after 5 days immersion and 10 mPa after 27 days immersion.

| Batch 3 - 50% (w/w) aqueous solution | | | | |
|---|---|---|---|---|
| Pellet Number | | 7 | 8 | 9 |
| Pressure applied | kPa | 6000 | 6000 | 6000 |
| Time in Oven | mins | 60 | 60 | 60 |
| Oven temp | deg C. | 100 | 100 | 100 |
| Pellet Diameter | mm | 20.0 | 20.0 | 20.0 |
| Pellet Thickness (height) | mm | 12.50 | 12.10 | 12.15 |
| OD Weight of Pellet | gm | 6.07 | 6.04 | 6.05 |
| Density of Cured Stone | gm/cc | 1.55 | 1.59 | 1.58 |
| Compressive Strength - DRY | mPa | >20 | | |
| Immersion time | days | | 5 | 27 |
| Compressive Strength - WET | mPa | | >20 | 18 |

The pellets of batch 3 had excellent dry and wet compressive strengths.

| Batch 4 - 50% powder and free water | | | | |
|---|---|---|---|---|
| Pellet Number | | 10 | 11 | 12 |
| Pressure applied | kPa | 6000 | 6000 | 6000 |
| Time in Oven | mins | 60 | 60 | 60 |
| Oven temp | deg C. | 100 | 100 | 100 |
| Pellet Diameter | mm | 20.0 | 20.0 | 20.0 |
| Pellet Thickness (height) | mm | 12.30 | 12.16 | 12.33 |
| OD Weight of Pellet | gm | 5.96 | 5.91 | 5.9 |
| Density of Cured Stone | gm/cc | 1.54 | 1.55 | 1.52 |
| Compressive Strength - DRY | mPa | >20 | | |
| Immersion time | days | | 5 | 27 |
| Compressive Strength - WET | mPa | | 17 | 10 |

The pellet of batch 4 had excellent dry compressive strength. Wet compressive strength was slightly reduced after 5 days immersion to 17 mPa and further reduced to 10 mPa after 27 days immersion.

Prior Art Compositions

Some prior art discloses compositions comprising large amounts of water. Examples of prior art compositions have the following oxide mole ratios

| | |
|---|---|
| $(Na_2O, K_2O)/SiO_2$ | 0.2 to 0.28 |
| $SiO_2/Al_2O_3$ | 3.5 to 4.5 |
| $H_2O/(Na_2O, K_2O)$ | 15 to 17.5 |
| $(Na_2O, K_2O)/Al_2O_3$ | 0.8 to 1.20 |

The present applicant has calculated that the lower oxide mole ratios of these compositions equate to compositions comprising the following:

| Mole ratio based on | $SiO_2$ % | $Al_2O_3$ % | NaOH/KOH % | Water % |
|---|---|---|---|---|
| $Na_2O:Al_2O_3$ | 35.5 | 17.2 | 10.8 | 36.5 |
| $Na_2O:SiO_2$ | 35.5 | 17.2 | 9.5 | 31.9 |
| $K_2O:Al_2O_3$ | 33.6 | 16.3 | 15.5 | 34.6 |
| $K_2O:SiO_2$ | 33.6 | 16.3 | 13.6 | 30.2 |

The present applicant has calculated that the upper oxide mole ratios of these compositions equate to compositions comprising the following:

| Mole ratio based on | $SiO_2$ % | $Al_2O_3$ % | NaOH/KOH % | Water % |
|---|---|---|---|---|
| $Na_2O:Al_2O_3$ | 31.9 | 12.0 | 11.3 | 44.7 |
| $Na_2O:SiO_2$ | 31.9 | 12.0 | 11.9 | 46.9 |
| $K_2O:Al_2O_3$ | 30.2 | 11.4 | 16.3 | 42.2 |
| $K_2O:SiO_2$ | 30.2 | 11.4 | 17.1 | 44.3 |

Another example of prior art compositions has the following oxide mole ratios

| | |
|---|---|
| $Na_2O/SiO_2$ | 0.20 to 0.48 |
| $SiO_2/Al_2O_3$ | 3.3 to 4.5 |
| $H_2O/Na_2O$ | 10 to 25 |

The present applicant has calculated that the lower oxide mole ratios of these compositions equate to compositions comprising the following:

| Mole ratio based on | SiO$_2$ % | Al$_2$O$_3$ % | NaOH % | Water % |
|---|---|---|---|---|
| Na$_2$O:SiO$_2$ | 42.0 | 21.6 | 11.2 | 25.2 |

The present applicant has calculated that the upper oxide mole ratios of these compositions equate to compositions comprising the following:

| Mole ratio based on | SiO$_2$ % | Al$_2$O$_3$ % | NaOH % | Water % |
|---|---|---|---|---|
| Na$_2$O:SiO$_2$ | 17.8 | 6.7 | 11.4 | 64.1 |

The method for preparing pellets from the prior art aggregate composition is as follows:
1. Mixing the alumina-silicate oxide with aqueous polysilicate, to the exclusion of alkali.
2. Adding to the solution a strong aqueous alkaline solution.
3. Casting the mixture into a mould.
4. Curing under polyethylene at 65° C. for one hour.
5. Demoulding.
6. Drying at 95° C. for one hour.

Comparative Aggregates

The present applicant has conducted the following experiments to demonstrate that the prior art compositions do not result in geopolymers that retain their compressive strength after immersion in water.

In one experiment, aggregates were prepared having oxide mole ratios approximately the same as the lower end ratios of the prior art aggregates. Specifically, the aggregate composition had the following oxide mole ratios:

| | |
|---|---|
| (Na$_2$O)/SiO$_2$ | 0.25 |
| SiO$_2$/Al$_2$O$_3$ | 3.32 |
| H$_2$O/(Na$_2$O) | 10.38 |

To achieve the above oxide mole ratios, the aggregate composition comprised 24.0% fly ash, 30.7% kaolin, 17.0% sodium silicate, 6.1% NaOH and 22.2% water. Based on the compositions of the fly ash, kaolin, and sodium silicate, the aggregate composition comprised 37.8% SiO$_2$, 19.3% Al$_2$O$_3$, 9.9% Na$_2$O and 29.8% water.

Six pellets (aggregates in the shape of pellets) were prepared from the aggregate composition. Each pellet was prepared in accordance with the prior art method. However, the present applicant found that curing for one hour at 65° C. was insufficient and instead the pellets were cured for one hour at 65° C., then 4.5 days at 13° C., then 12 hours at 65° C.

One of the pellets broke apart during demoulding. The remaining 5 pellets were dried for one hour at 95° C.

One pellet was tested for its dry compressive strength and had a dry compressive strength of just 5 mPa.

The remaining 4 pellets were immersed in water for 12 days with the intention of testing their wet compressive strength. However, all four pellets swelled and began disintegrating within 5 minutes of immersion and all pellets had completely disintegrated after the 12 days of immersion. Consequently, it was not possible to test the wet compressive strengths.

In another experiment, aggregates were prepared having oxide mole ratios approximately the same as the upper end ratios of the prior art aggregates. Specifically, the aggregate composition had the following oxide mole ratios:

| | |
|---|---|
| (Na$_2$O)/SiO$_2$ | 0.27 |
| SiO$_2$/Al$_2$O$_3$ | 4.5 |
| H$_2$O/(Na$_2$O) | 17.36 |
| (Na$_2$O)/Al$_2$O$_3$ | 1.23 |

To achieve the above oxide mole ratios, the aggregate composition comprised 34.8% fly ash, 7.2% kaolin, 14.9% sodium silicate, 5.6% NaOH and 37.5% water. Based on the compositions of the fly ash, kaolin, and sodium silicate, the aggregate composition comprised 31.2% SiO$_2$, 11.8% Al$_2$O$_3$, 8.8% Na$_2$O and 44.4% water.

Six pellets were prepared from the aggregate composition. Each pellet was prepared in accordance with the prior art method. However, the present applicant found that curing for one hour at 65° C. was insufficient and instead the pellets were cured for one hour at 65° C., then 4.5 days at 13° C., then 12 hours at 65° C.

The pellets were all very wet during curing and liquid leaked out of the base of the mould leading to thin samples.

All six pellets were successfully demoulded and dried for one hour at 95° C.

Two pellets were tested for their dry compressive strength and had dry compressive strengths of just 6 and 7 mPa.

The remaining 4 pellets were immersed in water for 12 days with the intention of testing their wet compressive strength. Two pellets completely disintegrated after the 12 days of immersion. Consequently, it was not possible to test their wet compressive strengths. Of the remaining two pellets, one pellet crumbled upon testing and so was considered to have a wet compressive strength of 0 mPa. The final pellet measured a wet compressive strength of 1 mPa.

Conclusions from Test Results

The conclusion from the above results was that including a large amount of water in the aggregate dilutes the alkaline component which may have a detrimental effect on the compressive strength of the aggregate, particularly the wet compressive strength.

Accordingly, the applicant has concluded that the optimum amount of water in the aggregate composition is about 6% to about 10% water by weight. For example, in one embodiment, the aggregate composition comprises about 6.5% to about 9.5% water, such as about 7% to about 9% water, or about 7.5% to about 8.5% water.

In one embodiment, the aggregate composition comprises about 6% to about 8% water by weight. For example, the aggregate composition may comprise 6.2% to about 7.8% water, or about 6.4 to about 7.6% water, or about 6.6% to about 7.4% water, or about 6.8% to about 7.2% water. In one particular embodiment, the aggregate composition comprises about 6.5% to about 7.5% water. For example, the aggregate composition may comprise about 6.5%, about 6.6%, about 6.7%, about 6.8%, about 6.9%, about 7.0%, about 7.1%, about 7.2%, about 7.3%, about 7.4% or about 7.5% water. In one embodiment, the aggregate composition comprises about 7.0% water.

It may alternatively be stated that the aggregate composition comprises at least about 6% of water by weight. For example, the aggregate composition may comprise at least about 6.5%, or at least about 7.0% water, or at least about 7.5% water, or at least about 8% water. In one embodiment, water is present in the aggregate composition in an amount of at least about 6.5% by weight.

As another alternative, it may be stated that the aggregate composition comprises up to about 10% water by weight. For example, the aggregate composition may comprise up to about 9.5% water, or up to about 9.0% water, or up to about 8.5% water, or up to about 8.0% water, or up to about 7.5% water, or up to about 7.0% water. In one embodiment, water is present in the aggregate composition in an amount of up to about 7.5% by weight.

Alkaline Component

The aggregate composition comprises an alkaline component.

The present applicant has conducted experiments to demonstrate the effect of including different amounts of alkaline component in the aggregate composition.

In one set of experiments, five batches of aggregates (in the form of pellets) were prepared with varying NaOH (caustic) contents and the following compositions:

| Batch Number | % Fly ash | % Kaolin | % NaOH | % Water | Si:Al ratio |
|---|---|---|---|---|---|
| 1 | 86.0 | 6.0 | 4 | 4 | 4.81 |
| 2 | 84.1 | 5.9 | 5 | 5 | 4.81 |
| 3 | 82.3 | 5.7 | 6 | 6 | 4.81 |
| 4 | 80.4 | 5.6 | 7 | 7 | 4.81 |
| 5 | 78.5 | 5.5 | 8 | 8 | 4.81 |

The NaOH in all batches was present as a 50% w/w solution with the water.

As an example, in batch 1 containing 4% sodium hydroxide, 8 g of 50% sodium hydroxide solution per 100 g of composition was prepared, which equates to 4 g per 100 g composition of sodium hydroxide and a contribution of 4 g per 100 g of composition to the water content of the composition.

It will be understood that all references to an amount of alkaline component refer to the amount of alkaline component only and excludes any water that may be in solution with the alkaline component.

Four pellets were made for each batch. Two pellets were subjected to a pressure of 5500 kPa before being cured in an oven for 60 minutes at 100° C. and two pellets were subjected to a pressure of 7000 kPa before being cured in an oven for 60 minutes at 100° C. The dry compressive strength of one pellet for each pressure was assessed with the other pellet for each pressure being immersed in water for one day and its wet compressive strength assessed. The results for each batch are shown below:

| Batch 1 - Caustic content 4% | | | | | |
|---|---|---|---|---|---|
| Pellet Number | | 1 | 2 | 3 | 4 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 9.40 | 9.34 | 9.80 | 9.06 |
| OD Weight of Pellet | gm | 4.26 | 4.25 | 4.55 | 4.21 |
| Density of Cured Stone | gm/cc | 1.44 | 1.45 | 1.48 | 1.48 |
| Compressive Strength - DRY | mPa | 11 | | 11 | |
| Immersion time | days | | 1 | | 1 |
| Compressive Strength - WET | mPa | | 4 | | 2 |

The pellets of batch 1 each showed compressive strength of 11 mPa when dry however, the compressive strength was just 4 mPa for the pellet prepared under a pressure of 5500 kPa and just 2 mPa for the pellet prepared under a pressure of 7000 kPa.

| Batch 2 - Caustic content 5% | | | | | |
|---|---|---|---|---|---|
| Pellet Number | | 5 | 6 | 7 | 8 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 10.40 | 10.60 | 11.81 | 11.29 |
| OD Weight of Pellet | gm | 4.81 | 4.93 | 5.61 | 5.36 |
| Density of Cured Stone | gm/cc | 1.47 | 1.48 | 1.51 | 1.51 |
| Compressive Strength - DRY | mPa | >20 | | >20 | |
| Immersion time | days | | 1 | | 1 |
| Compressive Strength - WET | mPa | | 6 | | 11 |

The pellets of batch 2 each showed excellent compressive strength of >20 mPa when dry. Compressive strength for the pellet prepared under a pressure of 7000 kPa was somewhat maintained following immersion in water for one day with the pellet having a wet compressive strength of 11 mPa. However, the pellet prepared under a pressure of 5500 kPa showed slightly worse wet compressive strength of 6 mPa.

| Batch 3 - Caustic content 6% | | | | | |
|---|---|---|---|---|---|
| Pellet Number | | 9 | 10 | 11 | 12 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 11.40 | 10.61 | 10.40 | 10.54 |
| OD Weight of Pellet | gm | 5.39 | 5.00 | 5.00 | 5.10 |
| Density of Cured Stone | gm/cc | 1.50 | 1.50 | 1.53 | 1.54 |
| Compressive Strength - DRY | mPa | >20 | | >20 | |
| Immersion time | days | | 1 | | 1 |
| Compressive Strength - WET | mPa | | 14 | | 15 |

The pellets of batch 3 both showed excellent compressive strength of >20 mPa when dry. Compressive strength of the pellets immersed in water for one day was good with a wet compressive strength of 14 mPa for the pellet prepared under a pressure of 5500 kPa and 15 mPa for the pellet prepared under a pressure of 7000 kPa.

| Batch 4 - Caustic content 7% | | | | | |
|---|---|---|---|---|---|
| Pellet Number | | 13 | 14 | 15 | 16 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 8.74 | 10.22 | 10.36 | 9.79 |
| OD Weight of Pellet | gm | 4.24 | 5.01 | 5.16 | 4.86 |
| Density of Cured Stone | gm/cc | 1.54 | 1.56 | 1.58 | 1.58 |
| Compressive Strength - DRY | mPa | >20 | | >20 | |
| Immersion time | days | | 1 | | 1 |
| Compressive Strength - WET | mPa | | >20 | | >20 |

The pellets of batch 4 showed excellent compressive strength of >20 mPa when dry. Compressive strength was also excellent following immersion in water for one day with both pellets showing a wet compressive strength of >20 mPa.

| Batch 5 - Caustic content 8% | | | | | |
|---|---|---|---|---|---|
| | | \multicolumn{4}{c}{Pellet Number} | | | |
| | | 17 | 18 | 19 | 20 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 8.67 | 9.29 | 8.94 | 8.67 |
| OD Weight of Pellet | gm | 4.42 | 4.71 | 4.63 | 4.47 |
| Density of Cured Stone | gm/cc | 1.62 | 1.61 | 1.65 | 1.64 |
| Compressive Strength - DRY | mPa | >20 | | >20 | |
| Immersion time | days | | 1 | | 1 |
| Compressive Strength - WET | mPa | | 18 | | 19 |

The pellets of batch 5 both showed excellent compressive strength of >20 mPa when dry. Compressive strength of the pellets immersed in water for one day was also excellent with a wet compressive strength of 18 mPa for the pellet prepared under a pressure of 5500 kPa and 19 mPa for the pellet prepared under a pressure of 7000 kPa.

In a second set of experiments, KOH was used as the alkaline component instead of NaOH. In these experiments, aggregates were prepared from an aggregate composition comprising 75.2% fly ash, 5.20% kaolin, 9.8% KOH and 9.8% water (as a 50% w/w aqueous solution). The Si:Al atomic ratio of the aggregate was 4.81. Six aggregates (pellets) were made and subjected to a pressure of 6000 kPa before being cured in an oven for 60 minutes at 100° C. Three pellets were tested for dry compressive strength and three pellets were tested for wet compressive strength following immersion in water varying amounts of time. The results are shown in the table below:

| | | \multicolumn{8}{c}{Pellet Number} | | | | | | | | |
|---|---|---|---|---|---|---|---|---|---|
| | | 1 | 2 | 3 | 4 | 5 | 6 | 7 | 8 |
| Pressure applied | kPa | 6000 | 6000 | 6000 | 6000 | 6000 | 6000 | 6000 | 6000 |
| Time in Oven | mins | 60 | 60 | 60 | 60 | 60 | 60 | 60 | 60 |
| Oven temp | deg C. | 100 | 100 | 100 | 100 | 100 | 100 | 100 | 100 |
| Pellet Diameter | mm | 20.0 | 20.0 | 20.0 | 20.0 | 20.0 | 20.0 | 20.0 | 20.0 |
| Pellet Thickness (height) | mm | 11.80 | 12.30 | 12.15 | 11.75 | 12.80 | 12.30 | 11.90 | 12.00 |
| OD Weight of Pellet | gm | 6.1 | 6.34 | 6.27 | 6.03 | 6.75 | 6.48 | 5.99 | 5.89 |
| Density of Cured Stone | gm/cc | 1.64 | 1.64 | 1.64 | 1.63 | 1.68 | 1.68 | 1.60 | 1.56 |
| Compressive Strength - DRY | mPa | >20 | | >20 | | >20 | | >20 | |
| Immersion time | days | | 6 days | | 13 days | | 70 days | | 111 days |
| Compressive Strength - WET | mPa | | >20 | | >20 | | >20 | | 20 |

All of the pellets showed excellent dry compressive strength (>20 mPa) and excellent wet compressive strength (of at least 20 mPa) regardless of whether they were immersed for 6 days, 13 days, 70 days or 111 days.

In view of the above results, the applicant concluded that the amount of the alkaline component in the aggregate composition may be about 6% to about 10% by weight, based on NaOH as the alkaline component. For example, in one embodiment, the aggregate composition comprises about 6.5% to about 9.5% alkaline component, such as about 7% to about 9% alkaline component, or about 7.5% to about 8.5% alkaline component.

In one embodiment, the amount of alkaline component, based on NaOH as the alkaline component, is about 6% to about 8% by weight. For example, the amount of alkaline component may be about 6.2% to about 7.8%, or about 6.4 to about 7.6%, or about 6.6% to about 7.4%, or about 6.8% to about 7.2%. In one particular embodiment, the aggregate composition comprises about 6.5% to about 7.5% of the alkaline component. For example, the aggregate composition may comprise about 6.5%, about 6.6%, about 6.7%, about 6.8%, about 6.9%, about 7.0%, about 7.1%, about 7.2%, about 7.3%, about 7.4% or about 7.5% of the alkaline component. In one embodiment, the aggregate composition comprises about 7.0% of the alkaline component.

It may alternatively be stated that the aggregate composition comprises at least about 6% of the alkaline component by weight, based on NaOH as the alkaline component. For example, the aggregate composition may comprise at least about 6.5%, or at least about 7.0%, or at least about 7.5%, or at least about 8% of the alkaline component. In one embodiment, the alkaline component is present in the aggregate composition in an amount of at least about 6.5%.

As another alternative, it may be stated that the aggregate composition comprises up to about 10% of the alkaline component by weight, based on NaOH as the alkaline component. For example, the aggregate composition may comprise up to about 9.5%, or up to about 9.0%, or up to about 8.5%, or up to about 8.0%, or up to about 7.5%, or up to about 7.0% of the alkaline component. In one embodiment, the alkaline component is present in the aggregate composition in an amount of up to about 7.5%.

Any alkaline component that is suitable for the formation of an aggregate may be used. However the applicant believes that it is important to maintain the amount (stoichiometric proportion) of hydroxide ion, irrespective of the type of cationic carrier. In one embodiment, the alkaline component is a metal hydroxide. For example, the alkaline component may be selected from the group consisting of aluminium hydroxide, beryllium hydroxide, caesium hydroxide, cobalt hydroxide, copper hydroxide, curium hydroxide, gold hydroxide, iron hydroxide, lithium hydroxide, mercury hydroxide, nickel hydroxide, potassium hydroxide, rubidium hydroxide, sodium hydroxide, tin hydroxide, uranyl hydroxide, zinc hydroxide and zirconium hydroxide and mixtures thereof. In another embodiment, the alkaline component is an alkali metal hydroxide. For example, the alkaline component may be selected from the group consisting of lithium hydroxide, sodium hydroxide, potassium hydroxide, rubidium hydroxide and caesium hydroxide and mixtures thereof.

In one embodiment the alkaline component is selected from the group consisting of potassium hydroxide and sodium hydroxide and a mixture thereof. In one particular embodiment, the alkaline component is potassium hydroxide. In another particular embodiment, the alkaline component is sodium hydroxide. When the component is sodium hydroxide, the alkaline component may be referred to as caustic soda.

The alkaline component may be included in the composition in any suitable form.

In one embodiment, the alkaline component may be present as a solution in the water that is present in the composition. The concentration of the solution may be any that can be obtained with the amount of alkaline component present in the composition. In one embodiment, the concentration of the solution is about a 40% solution. For example, the concentration of the solution may be about a 45% solution, or about a 50% solution, or about a 55% solution, or about a 60% solution. In a particular embodiment, the alkaline component is present as about a 50% solution.

When the alkaline component is present as a greater than about 50% solution, it may be necessary to warm the solution to keep the alkaline component dissolved.

The concentration of the solution can alternatively be expressed as a molar concentration. Therefore, in one embodiment, the alkaline component may be present as a solution having a molarity selected from the group consisting of about 11M, about 12M, about 13M, about 14M, about 15M, about 16M, about 17M, about 18M, about 19M, about 20M, about 21 M, about 22M and about 23M. The molarity of the alkaline component is preferably between about 15M and 23M, where the alkaline component is NaOH. Molarities below 15M are not preferred. Higher alkaline component concentrations lead to better products, particularly as a consequence of the lower water content in the composition.

When the alkaline component is present as a greater than about 19M solution, it may be necessary to warm the solution to keep the alkaline component dissolved. In one particular embodiment, the alkaline component is NaOH which is present as about a 19M solution. The molarity may be around 15M to 23M, or 17M to 21M. In another embodiment, the alkaline component is KOH which is present as about a 13M to about a 14M solution.

As noted above, an amount of 7% NaOH (and 7% water, contributed by 14% by weight of the total mass of mixture of a 50% (w/w) aqueous solution of NaOH) provides particularly good results. Where potassium hydroxide is used as the alkaline component, the equivalent amount of 50% (w/w) KOH that may be used in place of the 14% amount of 50% (w/w) NaOH solution is 19.6% KOH (9.8% KOH and 9.8% water, by weight based on the total weight of the mixture). The key factor is the moles of hydroxide ion per kilogram of total mixture.

A suitable amount of hydroxide ion (from the alkaline source) is between 1.375 and 2.100 moles hydroxide ion per kilogram of (uncured) geopolymer composition/mixture. The equivalent amounts of a 50% (w/w) NaOH or KOH solution in the total mixture is indicated in the table below.

| Molality (Moles of Hydroxide ion per kg of mix) | 1.125 | 1.250 | 1.375 | 1.500 | 1.625 | 1.750 | 1.875 | 2.000 | 2.125 | 2.250 |
|---|---|---|---|---|---|---|---|---|---|---|
| Equivalent amount of 50% (w/w) NaOH soln in mix | 9.0% | 10.0% | 11.0% | 12.0% | 13.0% | 14.0% | 15.0% | 16.0% | 17.0% | 18.0% |
| Equivalent amount of 50% (w/w) KOH soln in mix | 12.6% | 14.0% | 15.4% | 16.8% | 18.2% | 19.6% | 21.0% | 22.4% | 23.8% | 25.2% |
| Relative strength of geopol. aggregate | Very poor | Not so good | OK | Works well | Works well | Optimum | Works well | Works well | Just too much | Too much |

In one embodiment, the alkaline component is a 50% (w/w) solution of NaOH. In another embodiment, the alkaline component is a 50% (w/w) solution of KOH.

As already indicated previously, any water content in solutions of the alkaline component is excluded from the calculation of the weight percent amount of alkaline component in the aggregate composition, and forms part of the calculation of weight percent of water in the composition.

In one embodiment, the alkaline component is present as a solid. For example, the alkaline component may be present as a powder, or pellets (prills), or crushed pellets. In one embodiment, the alkaline component is present as crushed pellets. In one embodiment, the alkaline component is KOH which is present as crushed pellets. When the alkaline component is present as a solid, the water is added to the aggregate composition independently.

Fly Ash

The aggregate composition comprises fly ash or a fly ash substitute. Fly ash is a waste product resulting from the burning of coal in coal power stations. Fly ash is available in abundance and its disposal is a significant environmental issue.

The main ingredients of fly ash are $SiO_2$ and $Al_2O_3$. Typically, fly ash contains 60-75% $SiO_2$ and 20-30% $Al_2O_3$. Datasheets from Fly Ash Australia on analysis of Fly Ash from Eraring, Mt Piper and Bayswater Power Stations show the composition of fly ash to be in the range of 64-71% $SiO_2$ and 21-26% $Al_2O_3$.

Analysis of one source of fly ash using Scanning Electron Microscope—Energy Dispersive Spectroscopy (SEM-EDS) showed the following composition:

| Formula | Weight % |
| --- | --- |
| $Al_2O_3$ | 24.54 |
| $SiO_2$ | 64.99 |
| $Fe_2O_3$ | 3.53 |
| CaO | 1.98 |
| $Na_2O$ | 0.77 |
| $K_2O$ | 2.25 |
| $P_2O_5$ | 0.43 |
| MgO | 0.51 |
| $SO_3$ | 0.69 |
| MnO | 0.10 |

Any type of fly ash may be used in the aggregate composition. In one embodiment, the fly ash is selected from the group consisting of black coal fly ash and brown coal fly ash. In one particular embodiment, the fly ash is black coal fly ash.

It is preferable that the fly ash used in the aggregate composition has a low carbon content, as measured by loss on ignition (LOI), as this will increase the fire resistance of the aggregate and the resulting concrete. It is also speculated that a high LOI may prevent the particles in the aggregate composition from coming into close enough proximity for optimum compaction and bonding. Preferably, the fly ash has an LOI of less than about 4%. For example, less than about 3%, or less than about 2%, or less than about 1%.

In place of fly ash, a fly ash substitute may be used. A material that is suitable for use as a fly ash substitute is a particulate material comprising silica ($SiO_2$). The particulate material may further comprise aluminium oxide ($Al_2O_3$). The fly ash substitute may be a pozzolan. Pozzolans are siliceous or siliceous and aluminous materials that can react with calcium hydroxide in the presence of water. Suitable substitutes may include rice husk ash, volcanic ash and furnace slags, provided the desired silicon to aluminium ratios can be achieved.

The particulate material is suitably an amorphous particulate material. The particulate material is preferably of a fine particle size. The fine particle size is suitably similar to fly ash particle size. Thus, as described below, the fly ash substitute may have a fineness in the range indicated below, when measured in accordance with the test for fineness of fly ash set out in AS 3582.1. The fly ash substitute may additionally, or alternatively, have a particle size within the range indicated below for dry powder ingredients of the composition. The fly ash substitute preferably is a spherical amorphous particulate material.

It is also preferable that the fly ash (or fly ash substitute) used in the aggregate has a high fineness. It is thought that the fineness is important as it allows the particles in the aggregate composition into close proximity for optimum compaction and bonding. Accordingly, in one embodiment, the fly ash has a fineness of about 85% to about 95%, as measured using AS 3582.1 (1998). Fineness of commercial fly ash compositions is reported by fly ash suppliers, and is measured in accordance with the standard relevant to the given country. The Australian standard is referenced above. This standard provides a measure of fineness as measured using a 45 μm sieve. A fineness of a minimum of 70%, preferably 75%, or more preferably 80%, most preferably at least about 85% is desired. The fineness may be up to 99%, and may be in the range of about 85% to 97%, or 85% to 95%. Fly ashes having suitable particle size include Eraring Fly ash (89%), Bayswater Fly Ash (97%), Mt Piper fly ash (86%), Pt Augusta fly ash (86%), Collie fly ash (86%), and microash (ultrafine fly ash).

In one embodiment, the aggregate composition comprises by weight about 77% to about 84% of fly ash. For example, the aggregate composition may comprise about 78% to about 83% fly ash, or about 79% to about 82% fly ash, or about 80% to about 81% fly ash. In one particular embodiment, the aggregate composition comprises about 79% to about 82% fly ash. In another particular embodiment, the aggregate composition comprises about 80% to about 81% fly ash. For example, the aggregate composition may comprise about 80.2% fly ash, or about 80.4% fly ash, or about 80.6% fly ash, or about 80.8% fly ash. In one particular embodiment, the aggregate composition comprises about 80.4% fly ash. These amounts apply equally to fly ash substitutes, although it is noted that the amount will be balanced against the aluminium phyllosilicate to ensure the correct Si:Al ratio is achieved.

It may alternatively be stated that the aggregate composition comprises at least about 77% fly ash by weight. For example, at least about 78% fly ash, or at least about 79% fly ash, or at least about 80% fly ash. In one particular embodiment, the aggregate composition comprises at least about 79% fly ash. In another particular embodiment, the aggregate composition comprises at least about 80% fly ash.

As another alternative, it may be stated that the aggregate composition comprises up to about 84% fly ash by weight. For example, up to about 83% fly ash, or up to about 82% fly ash, or up to about 81% fly ash. In one particular embodiment, the aggregate composition comprises up to about 82% fly ash. In another particular embodiment, the aggregate composition comprises up to about 81% fly ash.

Aluminium Phyllosilicate

The aggregate composition comprises an aluminium phyllosilicate. The term aluminium phyllosilicate will be understood to include dehydrated (or dehydroxylated) aluminium phyllosilicates.

It may alternatively be said that the aggregate composition comprises an aluminium-containing clay. The term aluminium-containing clay will be understood to include dehydrated (or dehydroxylated) aluminium-containing clays.

Accordingly, using kaolin as an example, either kaolin or kaolinite can be used in the aggregate composition. In the art, and herein, the terms kaolin and kaolinite are used interchangeably. Kaolin may refer to a composition containing very little hydration, although there may be some.

Any aluminium phyllosilicate may be used in the invention. Examples of suitable aluminium phyllosilicates include, but are not limited to, kaolinite (kaolin), bentonite, halloysite, illite, montmorillonite, vermiculite, palygorskite and pyrophyllite. In one embodiment, the aluminium phyllosilicate is selected from the group consisting of kaolinite (kaolin) or bentonite. In one particular embodiment, the aluminium phyllosilicate is kaolinite (kaolin).

The aluminium phyllosilicate is typically an amorphous material. Crystalline materials are not suited.

The chemical formula for kaolinite is $Al_2O_3.2SiO_2.2H_2O$. The "Handbook of Mineralogy" from the Mineralogical Society of America states that the chemistry of Kaolinite is about 45.8% $SiO_2$, about 39.6% $Al_2O_3$ and about 13.9% $H_2O$. Kaolin has a similar composition but with less water. The extent of the water removal may be incomplete.

Any type of kaolin may be used in the aggregate.

Analysis of one source of kaolin using Scanning Electron Microscope—Energy Dispersive Spectroscopy (SEM-EDS) showed the following composition:

| Formula | Weight % |
|---|---|
| $Al_2O_3$ | 42.86 |
| $SiO_2$ | 55.16 |
| $TiO_2$ | 0.79 |
| $Fe_2O_3$ | 0.55 |
| $P_2O_5$ | 0.54 |
| CaO | 0.01 |
| $K_2O$ | 0.08 |

In one embodiment, the aggregate composition comprises by weight about 4% to about 7% of aluminium phyllosilicate by weight. For example, the aggregate composition may comprise about 4.5% to about 6.5% of aluminium phyllosilicate, or about 5% to about 6% of aluminium phyllosilicate.

In one particular embodiment, the aggregate composition comprises about 5% to about 6% of aluminium phyllosilicate by weight. For example, the aggregate composition may comprise about 5.2% of aluminium phyllosilicate, or about 5.4% of aluminium phyllosilicate, or about 5.6% of aluminium phyllosilicate, or about 5.8% of aluminium phyllosilicate. In one particular embodiment, the aggregate composition comprises about 5.6% of aluminium phyllosilicate.

It may alternatively be stated that the aggregate composition comprises at least about 4% of aluminium phyllosilicate by weight. For example, the aggregate composition may comprise at least about 4.5% of aluminium phyllosilicate, or at least about 5% of aluminium phyllosilicate, or at least about 5.5% of aluminium phyllosilicate. In one particular embodiment, the aggregate composition comprises at least about 5% of aluminium phyllosilicate. In another particular embodiment, the aggregate composition comprises at least about 5.5% of aluminium phyllosilicate.

As another alternative, it may be stated that the aggregate composition comprises up to about 7% of aluminium phyllosilicate by weight. For example, the aggregate composition may comprise up to about 6.5% of aluminium phyllosilicate, or up to about 6% of aluminium phyllosilicate. In one particular embodiment, the aggregate composition comprises up to about 6% of aluminium phyllosilicate.

Atomic Ratio of Silicon to Aluminium

The present applicant has conducted experiments showing that aggregates produced from aggregate compositions comprising silicon and aluminium in a particular atomic ratio have optimum compressive strength under both wet and dry conditions.

In the experiments, five batches of aggregates (pellets) were prepared with the following compositions and Si:Al ratios:

| Batch Number | % Fly ash | % Kaolin | % NaOH | % Water | Sodium metasilicate pentahydrate | Si:Al ratio |
|---|---|---|---|---|---|---|
| 1 | 0.0 | 89.3 | 5.35 | 5.35 | 0.0 | 2.46 |
| 2 | 76.5 | 9.8 | 6.85 | 6.85 | 0.0 | 4.61 |
| 3 | 80.3 | 5.6 | 7.05 | 7.05 | 0.0 | 4.81 |
| 4 | 71.8 | 4.9 | 6.8 | 6.8 | 9.7 | 5.08 |
| 5 | 89.3 | 0.0 | 5.35 | 5.35 | 0.0 | 5.10 |

The NaOH in all batches was present as a 50% w/w solution with the water. The Si:Al ratio was calculated based on fly ash containing about 65% $SiO_2$ and about 24.5% $Al_2O_3$, kaolin containing about 55% $SiO_2$ and about 43% $Al_2O_3$ and sodium metasilicate pentahydrate containing about 28.3% $SiO_2$.

Four pellets were made for each batch. Two pellets were subjected to a pressure of 5500 kPa before being cured in an oven for 60 minutes at 100° C. and two pellets were subjected to a pressure of 7000 kPa before being cured in an oven for 60 minutes at 100° C. The dry compressive strength of one pellet for each pressure was assessed with the other pellet for each pressure being immersed in water for three days before its wet compressive strength was assessed. The results for each batch are shown below:

Batch 1 - Si:Al ratio of 2.46

| | | Pellet Number | | | |
|---|---|---|---|---|---|
| | | 1 | 2 | 3 | 4 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 9.85 | 10.10 | 9.46 | 10.45 |
| OD Weight of Pellet | gm | 5.03 | 5.14 | 4.90 | 5.42 |
| Density of Cured Stone | gm/cc | 1.62 | 1.62 | 1.65 | 1.65 |
| Compressive Strength - DRY | mPa | 16 | | 16 | |
| Immersion time | days | | 3 days | | 3 days |
| Compressive Strength - WET | mPa | | 6 | | 7 |

The pellets of batch 1 each showed compressive strength of 16 mPa when dry. However, the compressive strength was just 6-7 mPa following immersion in water.

Batch 2 - Si:Al ratio of 4.61

| | | Pellet Number | | | |
|---|---|---|---|---|---|
| | | 5 | 6 | 7 | 8 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 9.98 | 9.82 | 10.52 | 10.03 |
| OD Weight of Pellet | gm | 5.08 | 4.98 | 5.40 | 5.16 |
| Density of Cured Stone | gm/cc | 1.62 | 1.61 | 1.63 | 1.64 |
| Compressive Strength - DRY | mPa | >20 | | >20 | |
| Immersion time | days | | 3 days | | 3 days |
| Compressive Strength - WET | mPa | | 13 | | 16 |

The pellets of batch 2 each showed excellent compressive strength of >20 mPa when dry. Compressive strength was reduced following immersion in water for 3 days. The pellets prepared under a pressure of 5500 kPa showed slightly worse wet compressive strength of 13 mPa whereas the pellets prepared under a pressure of 7000 kPa showed slightly better wet compressive strength of 16 mPa.

Batch 3 - Si:Al ratio of 4.81

| | | Pellet Number | | | |
|---|---|---|---|---|---|
| | | 9 | 10 | 11 | 12 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 10.93 | 10.95 | 12.10 | 11.95 |

-continued

Batch 3 - Si:Al ratio of 4.81

| | | Pellet Number | | | |
|---|---|---|---|---|---|
| | | 9 | 10 | 11 | 12 |
| OD Weight of Pellet | gm | 5.35 | 5.40 | 6.15 | 6.05 |
| Density of Cured Stone | gm/cc | 1.56 | 1.57 | 1.62 | 1.61 |
| Compressive Strength - DRY | mPa | >20 | | >20 | |
| Immersion time | days | | 3 days | | 3 days |
| Compressive Strength - WET | mPa | | >20 | | >20 |

The pellets of batch 3 each showed excellent compressive strength of >20 mPa when dry. Compressive strength was also excellent following immersion in water for 3 day with both pellets showing wet compressive strength of >20 mPa.

Batch 4 - Si:Al ratio of 5.08

| | | Pellet Number | | | |
|---|---|---|---|---|---|
| | | 13 | 14 | 15 | 16 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 9.06 | 9.90 | 9.22 | 9.82 |
| OD Weight of Pellet | gm | 4.60 | 5.08 | 4.74 | 5.09 |
| Density of Cured Stone | gm/cc | 1.62 | 1.63 | 1.64 | 1.65 |
| Compressive Strength - DRY | mPa | >20 | | >20 | |
| Immersion time | days | | 3 days | | 3 days |
| Compressive Strength - WET | mPa | | 12 | | 11 |

The pellets of batch 4 each showed excellent compressive strength of >20 mPa when dry. Compressive strength was slightly reduced following immersion in water for 3 days. The pellets prepared under a pressure of 5500 kPa showed slightly better wet compressive strength of 12 mPa whereas the pellets prepared under a pressure of 7000 kPa showed slightly worse wet compressive strength of 11 mPa.

Batch 5 - Si:Al ratio of 5.10

| | | Pellet Number | | | |
|---|---|---|---|---|---|
| | | 17 | 18 | 19 | 20 |
| Pressure applied | kPa | 5500 | 5500 | 7000 | 7000 |
| Time in Oven | mins | 60 | 60 | 60 | 60 |
| Oven temp | deg C. | 100 | 100 | 100 | 100 |
| Pellet Diameter | mm | 20.0 | 20.0 | 20.0 | 20.0 |
| Pellet Thickness (height) | mm | 10.45 | 9.88 | 10.34 | 9.98 |
| OD Weight of Pellet | gm | 4.67 | 4.41 | 4.69 | 4.51 |
| Density of Cured Stone | gm/cc | 1.42 | 1.42 | 1.44 | 1.44 |
| Compressive Strength - DRY | mPa | >20 | | >20 | |
| Immersion time | days | | 3 days | | 3 days |
| Compressive Strength - WET | mPa | | 7 | | 8 |

The pellets of batch 5 each showed excellent compressive strength of >20 mPa when dry. However, the compressive strength was just 7-8 mPa following immersion in water.

In view of the above results, in one embodiment, the aggregate composition (and aggregate) comprises silicon and aluminium in an atomic ratio (Si:Al ratio) of about 4.60 to about 5.10. For example, the atomic ratio may be about 4.70 to 5.00, or about 4.80 to about 4.90. In one particular embodiment, the Si:Al ratio is about 4.75 to 10 about 4.85. For example, the Si:Al ratio may be about 4.76 to about 4.84, or about 4.77 to about 4.83, or about 4.78 to about 4.82, or about 4.79 to about 4.81. In one particular embodiment, the Si:Al ratio is about 4.81.

It may alternatively be said that the aggregate composition (and aggregate) comprises silicon and aluminium in an atomic ratio of up to about 5.10. For example, the Si:Al ratio may be up to about 5.00, or up to about 4.80. In one particular embodiment, the Si:Al ratio may be up to about 4.85. For example, the Si:Al ratio may be up to about 4.84, or up to about 4.84, or up to about 4.83, or up to about 4.82, or up to about 4.81.

As another alternative, it may be stated that the aggregate composition (and aggregate) comprises silicon and aluminium in an atomic ratio of at least about 4.60. For example, the Si:Al ratio may be at least about 4.70, or at least about 4.80. In one particular embodiment, the Si:Al ratio may be at least about 4.75. For example, the Si:Al ratio may be at least about 4.76, or at least about 4.77, or at least about 4.78, or at least about 4.79, or at least about 4.80.

In addition to preparing a mixture comprising fly ash, kaolin (as aluminium phyllosilicate) and 50% (w/w) aqueous NaOH, a fly ash substitute based mixture was prepared, compressed into pellets, and cured, to form a fly ash substitute-based geopolymer aggregate. Amorphous silica of particle size similar to typical fly ash was used as the fly ash substitute, and the relative amounts of the fly ash substitute and kaolin were adjusted to achieve the required Si:Al ratio of 4.81.

| | | Pellet Number | |
|---|---|---|---|
| | | 1 | 2 |
| Pressure applied | kPa | 6000 | 6000 |
| Time in Oven | mins | 90 | 90 |
| Oven temp | deg C. | 100 | 100 |
| Pellet Diameter | mm | 20.0 | 20.0 |
| Pellet Thickness (height) | mm | 13.96 | 13.56 |
| OD Weight of Pellet | gm | 7.73 | 7.52 |
| Density of Cured Stone | gm/cc | 1.76 | 1.77 |
| Compressive Strength - DRY | mPa | >20 | |
| Immersion time | days | | 12 days |
| Compressive Strength - WET | mPa | | 10 |

Particle Size of all Dry Powder Ingredients of the Mixture or Aggregate Composition It is preferable that all of the dry powder ingredients used in the aggregate composition have a high fineness. Accordingly, in one embodiment, the dry powder ingredients have a fineness of about 85% to about 99%, as measured using AS 3582.1 (1998). This standard provides a measure of fineness as measured using a 45 μm sieve. A fineness of a minimum of 70%, preferably 75%, or more preferably 80%, most preferably at least about 85% is desired. The fineness may be up to 99%, and may be in the range of about 85% to 97%, or 85% to 95%.

In another embodiment, particle sizes are determined by reference to particle size distribution curves, showing the volume of particles of particular particle size. In this embodiment, the dry powder ingredient particles (fly ash or substitute, and aluminium phyllosilicate) have a particle size such that 80% of the particles are less than 1000 μm in size, preferably 80% of the particles are less than 100 μm in size, preferably 90% of the particles are less than 1000 μm in size, preferably 90% of the particles are less than 500 µm in size, and more preferably 90% of the particles are less than 100 µm in size.

Figure 4:
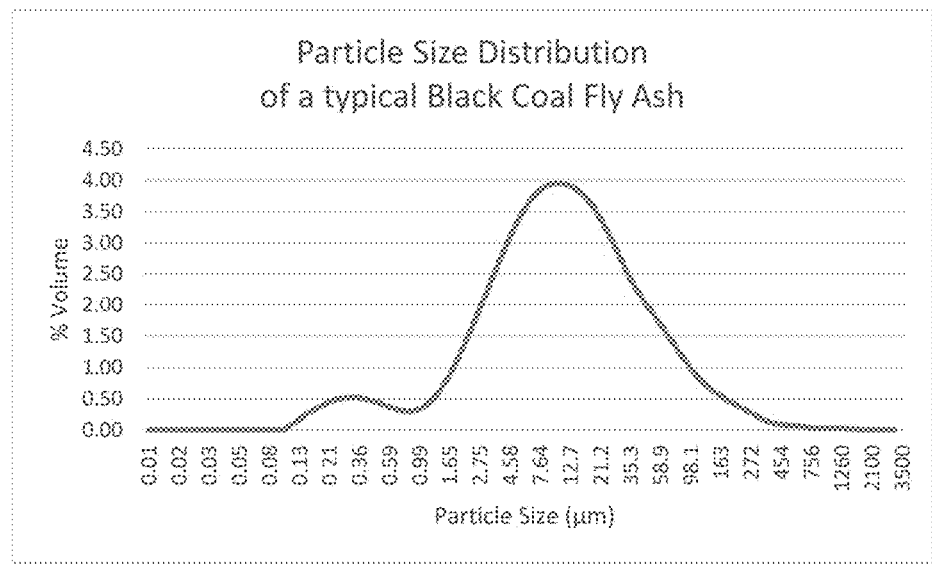
FIG. 4 shows a representative particle size distribution of one source of Fly Ash from a black coal fired power station.

Analysis of one source of Fly Ash from a black coal fired power station showed a particle size distribution as illustrated in FIG. 4.

Using this as an example of a suitable particle size distribution for the dry powder ingredient particles, it will be seen that at least 90% (by volume) of the particles are less than 500 µm in size, 90% less than 250 µm in size, and 90% less than 100 µm in size.

Aggregates Produced from the Aggregate Composition

The present application extends to aggregates produced from the aggregate composition described above. Since the aggregate is in the form of a geopolymer, it is not possible to express with precision the exact composition of the final aggregate product. However, the aggregate product will have a composition that corresponds to the (uncured) geopolymer aggregate composition used to produce the aggregate, but with less water and a modification of the chemical structure.

Additives

The aggregate composition may optionally contain additives. Any additive that could be beneficial to the use of the aggregate resulting from the composition can be included. Examples of additives that may be included in the aggregate composition include, flame retardants, pigments or dyes, lubricants, plasticisers, antibacterial agents, antifungal agents, surfactants, rheology modifiers and fibre-reinforcers.

The amount of the additive present in the aggregate composition may vary depending upon the nature of the additive. However the additive must be present in an amount sufficient to perform its desired function.

The geopolymer composition, or aggregate composition, may be substantially free of cement. The geopolymer composition or aggregate composition may be free of cement. The geopolymer composition or aggregate composition may be free of cement or other non-geopolymer strengthening agents. Non-geopolymer strengthening agents include high calcium (or magnesium) based products such as gypsum plaster, lime plaster or cement and organic glues.

The geopolymer composition, or aggregate composition, may comprise fly ash (or fly ash substitute), aluminium phyllosilicate, an alkaline component and water, in a total amount of at least 70%, at least 80%, at least 85%, or at least 90% of the composition. Any additives in addition to the fly ash, aluminium phyllosilicate, alkaline component and water preferably constitute not more than a total of 30%, 20%, 15%, or 10% of the (aggregate) composition.

The geopolymer composition, or aggregate composition, may consist essentially of fly ash (and/or fly ash substitute), aluminium phyllosilicate, an alkaline component, water, and one or more additives selected from the group consisting of flame retardants, pigments, dyes, lubricants, plasticisers, antibacterial agents, antifungal agents, surfactants, rheology modifiers and fibre-reinforcers. The (aggregate) composition may consist of the above components.

The geopolymer or aggregate material may consist essentially of the cured product of a composition consisting essentially of fly ash (and/or fly ash substitute), aluminium phyllosilicate, an alkaline component, water, and one or more additives selected from the group consisting of flame retardants, pigments, dyes, lubricants, plasticisers, antibacterial agents, antifungal agents, surfactants, rheology modifiers and fibre-reinforcers. The geopolymer or aggregate material may consist of the cured product of a composition that consists of fly ash (and/or fly ash substitute), aluminium phyllosilicate, an alkaline component, water, and one or more additives selected from the group consisting of flame retardants, pigments, dyes, lubricants, plasticisers, antibacterial agents, antifungal agents, surfactants, rheology modifiers and fibre-reinforcers.

Method Steps

The method of formation of the geopolymer or aggregate involves mixing the dry powder ingredients with an alkaline component and water, compacting (with the application of a particular compression force/pressure), and curing the compacted composition.

Forming Aggregates

The method of producing a geopolymer or geopolymer aggregate involves a first step of forming fly ash (or substitute), an aluminium phyllosilicate, an alkaline component and water into a mixture, which may be described in some embodiments as an aggregate composition.

Any method of forming the components into an aggregate composition may be used. For example, in one embodiment, the method may comprise forming a mixture of all components into an aggregate composition. In another embodiment, the method may comprise forming a mixture of fly ash (or substitute), an aluminium phyllosilicate and alkaline component then adding the water. In still another embodiment, the method may comprise forming a mixture of fly ash (or substitute) and an aluminium phyllosilicate then adding the alkaline component and water as a solution to form the aggregate composition.

In one embodiment, the method involves mixing the fly ash and aluminium phyllosilicate until a homogeneous mixture is formed. Then adding the alkaline component and water as a solution and mixing again until a homogeneous mixture is formed.

It is preferred that the components of the aggregate composition form a homogeneous mixture. It is thought that a homogeneous mixture ensures that the particles in the aggregate composition are optimally positioned for bonding during the compaction phase. It is preferred that there is no significant delay between forming the aggregate composition and the subsequent step of applying pressure to the aggregate composition to form the aggregate. In other words, it is preferred that a freshly prepared mixture is used in the method. The time period between formation of the mixture, and compaction, is preferably not more than 5 hours, preferably not more than 4, 3, 2 or 1 hours. The time period is preferably less than 1 hour, such as 50 minutes or less, 40 minutes or less, or 30 minutes or less. However, mixtures that are several hours old (or where there is several hours delay between preparation and pressure application) can still provide aggregates with good dry and wet compressive strength. The applicant has undertaken experiments to illustrate this point. In the experiments, a mixture comprising 80.4% fly ash, 5.6% kaolin, 7% NaOH and 7% water (as a 50% w/w aqueous solution) was prepared. The Si:Al atomic ratio of the mixture was 4.81.

A series of samples were prepared with a different amount of aging (period of delay) between preparation of the aggregate composition and the step of applying pressure. The step of applying pressure involved subjecting the samples to a pressure of 6000 kPa. The samples were then cured in an oven for 60 minutes at 100° C.

The dry compressive strength of one pellet for each aging period was assessed with the other pellet from each pair being immersed in water for four days before its wet compressive strength was assessed. The results from these experiments are shown below:

Fresh mixture

| | | Pellet Number | |
|---|---|---|---|
| | | 1 | 2 |
| Pressure applied | kPa | 6000 | 6000 |
| Time in Oven | mins | 60 | 60 |
| Oven temp | deg C. | 100 | 100 |
| Pellet Diameter | mm | 13.8 | 13.8 |
| Pellet Thickness (height) | mm | 11.15 | 11.05 |
| OD Weight of Pellet | gm | 2.65 | 2.62 |
| Density of Cured Stone | gm/cc | 1.59 | 1.58 |
| Compressive Strength - DRY | mPa | >20 | |
| Immersion time | days | | 4 days |
| Compressive Strength - WET | mPa | | >20 |

The pellets from the fresh mixture had excellent dry and wet compressive strengths, both >20 mPa.

Aged 2 hours

| | | Pellet Number | |
|---|---|---|---|
| | | 3 | 4 |
| Pressure applied | kPa | 6000 | 6000 |
| Time in Oven | mins | 60 | 60 |
| Oven temp | deg C. | 100 | 100 |
| Pellet Diameter | mm | 13.8 | 13.8 |
| Pellet Thickness (height) | mm | 11.50 | 11.90 |
| OD Weight of Pellet | gm | 2.77 | 2.91 |
| Density of Cured Stone | gm/cc | 1.61 | 1.63 |
| Compressive Strength - DRY | mPa | >20 | |
| Immersion time | days | | 4 days |
| Compressive Strength - WET | mPa | | 18 |

Pellets formed from the mixture that had been aged for 2 hours had excellent dry compressive strength of >20 mPa and very good wet compressive strength of 18 mPa.

Aged 4 hours

| | | Pellet Number | |
|---|---|---|---|
| | | 5 | 6 |
| Pressure applied | kPa | 6000 | 6000 |
| Time in Oven | mins | 60 | 60 |
| Oven temp | deg C. | 100 | 100 |
| Pellet Diameter | mm | 13.8 | 13.8 |
| Pellet Thickness (height) | mm | 11.40 | 11.50 |
| OD Weight of Pellet | gm | 2.66 | 2.73 |
| Density of Cured Stone | gm/cc | 1.56 | 1.59 |
| Compressive Strength - DRY | mPa | 20 | |
| Immersion time | days | | 4 days |
| Compressive Strength - WET | mPa | | 10 |

Pellets formed from the mixture that had been aged for 4 hours had excellent dry compressive strength of 20 mPa. However, wet compressive strength after 4 days immersion in water was only 10 mPa.

Aged 5 hours

| | | Pellet Number | |
|---|---|---|---|
| | | 7 | 8 |
| Pressure applied | kPa | 6000 | 6000 |
| Time in Oven | mins | 60 | 60 |
| Oven temp | deg C | 100 | 100 |
| Pellet Diameter | mm | 13.8 | 13.8 |
| Pellet Thickness (height) | mm | 11 | 11.00 |
| OD Weight of Pellet | gm | 2.69 | 2.62 |
| Density of Cured Stone | gm/cc | 1.63 | 1.59 |
| Compressive Strength-DRY | mPa | >20 | |
| Immersion time | days | | 4 days |
| Compressive Strength-WET | mPa | | 9 |

Aging the mixture for a further one hour to a total of 5 hours before forming the pellets still provided excellent dry compressive strength (>20 mPa) but the wet compressive strength was slightly worse at 9 mPa.

Aged 6 hours

| | | Pellet Number | |
|---|---|---|---|
| | | 9 | 10 |
| Pressure applied | kPa | 6000 | 6000 |
| Time in Oven | mins | 60 | 60 |
| Oven temp | deg C | 100 | 100 |
| Pellet Diameter | mm | 13.8 | 13.8 |
| Pellet Thickness (height) | mm | 11.30 | 11.80 |
| OD Weight of Pellet | gm | 2.62 | 2.77 |
| Density of Cured Stone | gm/cc | 1.55 | 1.57 |
| Compressive Strength-DRY | mPa | >20 | |
| Immersion time | days | | 4 days |
| Compressive Strength-WET | mPa | | 8 |

Aging the mixture for a further one hour to a total of 6 hours before forming the pellets still provided excellent dry compressive strength (>20 mPa) but the wet compressive strength was slightly worse at 8 mPa.

In view of the above results, in one embodiment the method involves forming a mixture of two or more components into an aggregate composition, wherein the mixture has been aged for not more than about 3 hours. For example, in one embodiment, the mixture has been aged for not more than 2 hours, or the mixture has been aged for not more than one hour. In one particularly preferred embodiment, the method involves forming a freshly prepared mixture of two or more components into an aggregate composition.

Expressed another way, the step of pressure application takes place not more than the stated number of hours referred to above.

Pressure

The method involves applying a pressure to the aggregate composition. The pressure may be applied to the aggregate composition by any suitable means known in the art. The method may comprise the step of applying pressure to the aggregate composition in a press to form an aggregate. In one embodiment, the pressure is applied by a mechanical press, a roll press, a hydraulic press or a pneumatic press. In one embodiment, the pressure is applied by a hydraulic press.

The present applicant has conducted significant experimentation to establish the optimum pressure that should be applied to the aggregate composition. In the experiments, a mixture comprising 80.4% fly ash, 5.6% kaolin, 7% NaOH and 7% water (as a 50% w/w aqueous solution) was prepared. The Si:Al atomic ratio of the mixture was 4.81. From the mixture, 16 aggregates were formed and these were divided into 8 batches comprising two pellets each. Both pellets in each batch were subjected to a pressure before being cured in an oven for 60 minutes at 100° C. Each batch was subjected to a different pressure ranging from 200 kPa (2 kgf/sq·cm) to 12000 kPa (122 kgf/sq·cm)

The dry compressive strength of one pellet from each batch was assessed with the other pellet from each batch being immersed in water for 22 hours before its wet compressive strength was assessed. The results from these experiments are shown below:

| Batches 1 and 2-200 kPa and 700 kPa | | | | | |
| --- | --- | --- | --- | --- | --- |
| Pellet Number | | 1 | 2 | 3 | 4 |
| Pressure applied | kPa | 200 | 200 | 700 | 700 |
| Time in Oven | mins | 60 | 60 | 60 | 60 |
| Oven temp | deg C | 100 | 100 | 100 | 100 |
| Pellet Diameter | mm | 20.0 | 20.0 | 20.0 | 20.0 |
| Pellet Thickness (height) | mm | 15.84 | 15.54 | 16.85 | 17.21 |
| OD Weight of Pellet | gm | 5.20 | 5.05 | 5.76 | 5.76 |
| Density of Cured Stone | gm/cc | 1.04 | 1.03 | 1.09 | 1.06 |
| Compressive Strength-DRY | mPa | 5 | | 5 | |
| Immersion time | hours | | 22 | | 22 |
| Compressive Strength-WET | mPa | | 0 | | 0 |

Applying a pressure of 200 kPa (2 kgf/sq·cm) or 700 kPa (7 kgf/sq·cm) provided pellets with poor dry compressive strength (5 mPa) and no measurable wet compressive strength (0 mPa).

| Batch 3-4000 kPa | | | |
| --- | --- | --- | --- |
| Pellet Number | | 5 | 6 |
| Pressure applied | kPa | 4000 | 4000 |
| Time in Oven | mins | 60 | 60 |
| Oven temp | deg C | 100 | 100 |
| Pellet Diameter | mm | 20.0 | 20.0 |
| Pellet Thickness (height) | mm | 10.96 | 11.37 |
| OD Weight of Pellet | gm | 5.09 | 5.30 |
| Density of Cured Stone | gm/cc | 1.48 | 1.48 |
| Compressive Strength-DRY | mPa | 20 | |
| Immersion time | hours | | 22 |
| Compressive Strength-WET | mPa | | 12 |

Applying a pressure of 4000 kPa (41 kgf/sq·cm) provided pellets with excellent dry compressive strength (20 mPa) and reasonable wet compressive strength (12 mPa).

| Batches 4 and 5-5500 kPa and 7000 kPa | | | | | |
| --- | --- | --- | --- | --- | --- |
| Pellet Number | | 7 | 8 | 9 | 10 |
| Pressure applied | kPa | 5500 | 5500 | 7000 | 7000 |
| Time in Oven | mins | 60 | 60 | 60 | 60 |
| Oven temp | deg C | 100 | 100 | 100 | 100 |
| Pellet Diameter | mm | 20.0 | 20.0 | 20.0 | 20.0 |
| Pellet Thickness (height) | mm | 8.74 | 10.22 | 10.36 | 9.79 |
| OD Weight of Pellet | gm | 4.24 | 5.01 | 5.16 | 4.86 |
| Density of Cured Stone | gm/cc | 1.54 | 1.56 | 1.58 | 1.58 |
| Compressive Strength-DRY | mPa | >20 | | >20 | |
| Immersion time | hours | | 22 | | 22 |
| Compressive Strength-WET | mPa | | >20 | | >20 |

Applying a pressure of 5500 kPa (56 kgf/sq·cm) or 7000 kPa (71 kgf/sq·cm) provided pellets with excellent dry compressive strength and wet compressive strength, both >20 mPa.

| Batch 6-8500 kPa | | | |
| --- | --- | --- | --- |
| Pellet Number | | 11 | 12 |
| Pressure applied | kPa | 8500 | 8500 |
| Time in Oven | mins | 60 | 60 |
| Oven temp | deg C | 100 | 100 |
| Pellet Diameter | mm | 20.0 | 20.0 |
| Pellet Thickness (height) | mm | 10.32 | 10.10 |
| OD Weight of Pellet | gm | 5.20 | 5.10 |
| Density of Cured Stone | gm/cc | 1.60 | 1.61 |
| Compressive Strength-DRY | mPa | >20 | |
| Immersion time | hours | | 22 |
| Compressive Strength-WET | mPa | | 20 |

Applying a pressure of 8500 kPa (87 kgf/sq·cm) provided pellets with excellent dry compressive strength (>20 mPa) and excellent wet compressive strength (20 mPa).

| Batch 7-10500 kPa | | | |
| --- | --- | --- | --- |
| Pellet Number | | 13 | 14 |
| Pressure applied | kPa | 10500 | 10500 |
| Time in Oven | mins | 60 | 60 |
| Oven temp | deg C | 100 | 100 |
| Pellet Diameter | mm | 20.0 | 20.0 |
| Pellet Thickness (height) | mm | 9.52 | 10.03 |
| OD Weight of Pellet | gm | 4.82 | 5.08 |
| Density of Cured Stone | gm/cc | 1.61 | 1.61 |
| Compressive Strength-DRY | mPa | >20 | |
| Immersion time | hours | | 22 |
| Compressive Strength-WET | mPa | | 14 |

Increasing the pressure applied to the pellets to 10500 kPa (107 kgf/sq·cm) still provided pellets with excellent dry compressive strength (>20 mPa) but immersion in water for 22 hours yield a reduced wet compressive strength of 14 mPa.

| Batch 8-12000 kPa | | | |
| --- | --- | --- | --- |
| Pellet Number | | 15 | 16 |
| Pressure applied | kPa | 12000 | 12000 |
| Time in Oven | mins | 60 | 60 |
| Oven temp | deg C | 100 | 100 |
| Pellet Diameter | mm | 20.0 | 20.0 |
| Pellet Thickness (height) | mm | 10.42 | 10.44 |
| OD Weight of Pellet | gm | 5.35 | 5.35 |
| Density of Cured Stone | gm/cc | 1.63 | 1.63 |
| Compressive Strength-DRY | mPa | >20 | |
| Immersion time | hours | | 22 |
| Compressive Strength-WET | mPa | | 9 |

Increasing the pressure applied to the compressed mixture (such as the pellets) further still to 12000 kPa (122 kgf/sq·cm) still provided pellets with excellent dry compressive strength (>20 mPa) but immersion in water for 22 hours yield a further reduced wet compressive strength of 9 mPa.

Without wishing to be bound by theory, it is thought that the amount of pressure applied to the mixture, or aggregate composition, is important because applying the pressure brings the particles into close proximity so that they can bond during the curing step. It is speculated that using too much pressure may squeeze the alkaline component out of the aggregate composition, therefore reducing the strength of the aggregate.

In view of the above results, in one embodiment, the method comprises applying a pressure of about 50 to about 90 kgf/cm$^2$. For example, about 55 to about 85 kgf/cm$^2$, or about 60 to about 80 kgf/cm², or about 65 to about 75 kgf/cm². In one particular embodiment, the method comprises applying a pressure of about 55 to about 70 kgf/cm².

It may alternatively be said that the method comprises applying a pressure of at least about 50 kgf/cm². For example, the method may comprise applying a pressure of at least about 55 kgf/cm², or at least about 60 kgf/cm², or at least about 65 kgf/cm².

As another alternative, it may be said that the method comprises applying a pressure of up to about 90 kgf/cm². For example, the method may comprise applying a pressure of up to about 85 kgf/cm², or up to about 80 kgf/cm², or up to about 75 kgf/cm², or up to about 70 kgf/cm².

In one particularly preferred embodiment the method comprises applying a pressure of about 65 kgf/cm² to the (aggregate) composition.

In one embodiment, the pressure may be referred to in general terms of kPa applied to the aggregate (pellet) composition. In this embodiment, the method may comprise applying a pressure of about 5000 to about 9000 kPa to the aggregate composition. For example, the method may comprise applying a pressure of about 5500 to about 8500 kPa, or about 6000 to about 8000 kPa, or about 6500 to about 7500 kPa. In one embodiment, the method comprises applying a pressure of about 5500 to about 7000 kPa to the aggregate composition.

It may alternatively be said that the method comprises applying a pressure of at least about 5000 kPa. For example, the method may comprise applying a pressure of at least about 5500 kPa, or at least about 6000 kPa, or at least about 6500 kPa.

As another alternative, it may be said that the method comprises applying a pressure of up to about 9000 kPa. For example, the method may comprise applying a pressure of up to about 8500 kPa, or up to about 8000 kPa, or up to about 7500 kPa, or up to about 7000 kPa.

In a particularly preferred embodiment the method comprises applying a pressure of about 6500 kPa to the aggregate composition.

Curing

The method involves curing the compressed mixture or aggregate. Any curing technique known in the art can be used to cure the compressed mixture/aggregate. For example, the curing may be effected by heat, steam, radiation or air.

In one embodiment, the formed aggregate is heat cured. The present applicant has conducted significant experimentation to establish the optimum time and temperature for heat curing. In the experiments, 80.4% fly ash, 5.6% kaolin, 7% NaOH and 7% water (as a 50% w/w aqueous solution) was formed into aggregates (pellets) by the application of a pressure of 5500 kPa. The aggregates had a Si:Al atomic ratio of 4.81.

The pellets were divided into 5 batches comprising two or three pellets each. The pellets in each batch were oven cured for a different time and/or at a different temperature. The dry compressive strength of one pellet per batch was assessed and, with the exception of batch 1, the other pellets in each batch were immersed in water for 5 or 7 days before their wet compressive strength was assessed. The results of each of the batches are shown below.

| Batch 1-cured for 13 minutes at 100° C. | | | |
|---|---|---|---|
| Pellet Number | | 1 | 2 |
| Pressure applied | kPa | 5500 | 5500 |
| Time in Oven | mins | 13 | 13 |
| Oven temp | deg C | 100 | 100 |
| Pellet Diameter | mm | 20.0 | 20.0 |
| Pellet Thickness (height) | mm | 10.75 | 10.54 |
| OD Weight of Pellet | gm | 5.60 | 5.46 |
| Density of Cured Stone | gm/cc | 1.66 | 1.65 |
| Compressive Strength-DRY | mPa | 3 | 2 |
| Immersion time | days | | |
| Compressive Strength-WET | mPa | | |

Oven curing the pellets at 100° C. for 13 minutes did not produce an aggregate having good dry compression strength. Without wishing to be bound by theory, this may be because 13 minutes was not long enough for the heat to penetrate the core of the aggregate. Accordingly, the core would not have been cured, resulting in the poor compressive strength.

As pellets 1 and 2 had such poor dry compression strength, they were not immersed in water and assessed for wet compressive strength.

| Batch 2-cured for 60 minutes at 100° C. | | | | |
|---|---|---|---|---|
| Pellet Number | | 3 | 4 | 5 |
| Pressure applied | kPa | 5500 | 5500 | 5500 |
| Time in Oven | mins | 60 | 60 | 60 |
| Oven temp | deg C | 100 | 100 | 100 |
| Pellet Diameter | mm | 20.0 | 20.0 | 20.0 |
| Pellet Thickness (height) | mm | 10.93 | 10.88 | 10.63 |
| OD Weight of Pellet | gm | 5.35 | 5.30 | 5.23 |
| Density of Cured Stone | gm/cc | 1.56 | 1.55 | 1.57 |
| Compressive Strength-DRY | mPa | >20 | | |
| Immersion time | days | | 5 days | 7 days |
| Compressive Strength-WET | mPa | | 20 | >20 |

Oven curing the pellets at 100° C. for 60 minutes provided an aggregate with excellent dry compressive strength (>20 mPa). Immersing the aggregate in water for 5 or 7 days did not diminish the strength as both aggregates displayed wet compressive strengths of 20 and >20 mPa. Thermocouple tests on these aggregates indicated that the core of the aggregate reached 97° C. after 30 minutes in the oven. Accordingly, 60 minutes allowed sufficient time for the heat to penetrate and cure the core of the aggregate.

| Batch 3-cured for 60 minutes at 120° C. | | | | |
|---|---|---|---|---|
| Pellet Number | | 6 | 7 | 8 |
| Pressure applied | kPa | 5500 | 5500 | 5500 |
| Time in Oven | mins | 60 | 60 | 60 |
| Oven temp | deg C | 120 | 120 | 120 |
| Pellet Diameter | mm | 20.0 | 20.0 | 20.0 |
| Pellet Thickness (height) | mm | 8.24 | 10.44 | 10.47 |
| OD Weight of Pellet | gm | 3.98 | 5.08 | 5.14 |
| Density of Cured Stone | gm/cc | 1.54 | 1.55 | 1.56 |
| Compressive Strength-DRY | mPa | >20 | | |
| Immersion time | days | | 5 days | 7 days |
| Compressive Strength-WET | mPa | | >20 | 20 |

Increasing the temperature to 120° C. but still curing the aggregates for 60 minutes also provided aggregates with excellent dry and wet compressive strengths. Thermocouple tests on these aggregates indicated that the core of the aggregate reached 114° C. after 30 minutes in the oven. Accordingly, 60 minutes at 120° C. allowed sufficient time for the heat to penetrate and cure the core of the aggregate.

| Batch 4-cured for 40 minutes at 120° C. | | | | |
|---|---|---|---|---|
| Pellet Number | | 9 | 10 | 11 |
| Pressure applied | kPa | 5500 | 5500 | 5500 |
| Time in Oven | mins | 40 | 40 | 40 |
| Oven temp | deg C | 120 | 120 | 120 |
| Pellet Diameter | mm | 20.0 | 20.0 | 20.0 |
| Pellet Thickness (height) | mm | 10.99 | 11.32 | 10.81 |
| OD Weight of Pellet | gm | 5.34 | 5.41 | 5.24 |
| Density of Cured Stone | gm/cc | 1.55 | 1.52 | 1.54 |
| Compressive Strength-DRY | mPa | >20 | | |
| Immersion time | days | | 5 days | 7 days |
| Compressive Strength-WET | mPa | | 17 | 20 |

Maintaining the temperature at 120° C. but reducing the curing time to 40 minutes still produced an aggregate with excellent dry compressive strength. However, the wet compressive strength appeared to be slightly reduced after 5 days immersion (17 mPa) although it was still excellent for the pellet immersed for 7 days (20 mPa). Thermocouple tests on these aggregates indicated that the core of the aggregate reached 107° C. after 20 minutes in the oven. Accordingly, 40 minutes at 120° C. allowed sufficient time for the heat to penetrate and cure the core of the aggregate.

| Batch 5-cured for 20 minutes at 140° C. | | | | |
|---|---|---|---|---|
| Pellet Number | | 12 | 13 | 14 |
| Pressure applied | kPa | 5500 | 5500 | 5500 |
| Time in Oven | mins | 20 | 20 | 20 |
| Oven temp | deg C | 140 | 140 | 140 |
| Pellet Diameter | mm | 20.0 | 20.0 | 20.0 |
| Pellet Thickness (height) | mm | 10.13 | 9.76 | 9.98 |
| OD Weight of Pellet | gm | 4.85 | 4.71 | 4.78 |
| Density of Cured Stone | gm/cc | 1.52 | 1.54 | 1.52 |
| Compressive Strength-DRY | mPa | >20 | | |
| Immersion time | days | | 5 days | 7 days |
| Compressive Strength-WET | mPa | | 18 | 14 |

Increasing the curing temperature further to 140° C. and reducing the curing time further to 20 minutes still provided an aggregate with excellent dry compressive strength. However, the wet compressive strength was slightly reduced after 5 days immersion (18 mPa) and further reduced following 7 days immersion (14 mPa). Thermocouple tests on these aggregates indicated that the core of the aggregate had reached 123° C. after 20 minutes in the oven. Accordingly, 20 minutes at 140° C. allowed sufficient time for the heat to penetrate the core of the aggregate, but insufficient time for complete curing to occur.

It appears from these results that increasing the curing temperature does not necessarily allow the curing time to be reduced and still produce an aggregate with good dry and wet compressive strength. However, sufficient time must be allowed to ensure that the heat penetrates to the core of the aggregate. The optimum curing temperature and time is therefore a balance between the temperature and time that can provide the most economical outcome for the aggregate production.

In view of the above experiments, in one embodiment, the aggregate is cured at a temperature of about 80° C. to about 150° C. For example, the aggregate may be cured at a temperature of about 85° C. to about 140° C., or about 90° C. to about 1300° C., or about 95° C. to about 1200° C. In one particular embodiment, the aggregate is cured at a temperature of about 90° C. to about 120° C. In one preferred embodiment, the aggregate is cured at a temperature of about 100° C.

It may alternatively be stated the aggregate is cured at a temperature of at least about 80° C. For example, the aggregate may be cured at a temperature of at least about 85° C., or at least about 90° C., or at least about 95° C. In one particular embodiment, the aggregate is cured at a temperature of at least about 90° C.

As another alternative, it may be stated that the aggregate is cured at a temperature of up to about 150° C. For example, the aggregate may be cured at a temperature of up to about 140° C., or up to about 130° C., or up to about 120° C. In one particular embodiment, the aggregate is cured at a temperature of up to about 120° C.

In one embodiment, the aggregate is cured for about 20 to about 120 minutes. For example, the aggregate may be cured for about 30 to about 110 minutes, or about 40 to about 100 minutes, or about 50 to about 90 minutes, or about 60 to about 80 minutes.

It may alternatively be stated that the aggregate is cured for at least about 20 minutes. For example, the aggregate may be cured for at least about 30 minutes, or at least about 40 minutes, or at least about 50 minutes, or at least about 60 minutes.

As another alternative, it may be stated that the aggregate is cured for up to about 120 minutes. For example, the aggregate may be cured for up to about 110 minutes, or up to about 100 minutes, or up to about 90 minutes, or up to about 80 minutes.

In one embodiment, the aggregate is cured for about 60 minutes.

In one particular embodiment, the aggregate is cured at a temperature of about 900° C. to about 1200° C. for about 50 minutes to about 90 minutes. In one particularly preferred embodiment, the aggregate is cured at a temperature of about 100° C. for about 60 minutes.

Whilst such time periods are well suited to the production of geopolymer pieces or pellets, if the geopolymer is formed as a geopolymer mass of greater cross-sectional area, which is then broken into pieces, then longer curing times may be suited. Thus, if the thickness of the compacted mixture is doubled from about 12 mm to 24 mm in thickness, doubling of the time period may be suited. Thus, the time of curing may be taken from about 45 minutes (at 150° C.) or 1 to 1.5 hours (at 100° C.) or 2 hours (at 80° C.), to about 1.5 hours (at 150° C.), or 2-3 hours (at 100° C.) or about 4 hours (at 80° C.). Thus, for a typical size of compacted mixture that is contemplated for many embodiments, the time period of curing may be in the region of 45 minutes to about 2 hours.

The curing conditions used herein are to be contrasted to sintering processes where sintering temperatures in excess of 800° C. are applied. The curing step as required herein is less energy intensive, and still results in formation of geopolymers having the desired properties.

Geopolymer or Aggregate Size/Shape Following Curing

The aggregates may be of any size that is suitable for their intended use. The present applicant has investigated the effect of aggregate size on dry and wet compressive strengths and found that the aggregates can be produced in a range of sizes and still have excellent dry and wet compressive strengths. In the relevant experiments, 80.4% fly ash, 5.6% kaolin, 7% NaOH and 7% water (as a 50% w/w aqueous solution) was formed into cylindrical aggregates (pellets) of different diameters. Four different sized aggregates were prepared with two aggregates for each size. The aggregates had a Si:Al atomic ratio of 4.81.

A pressure of 6000 kPa (61 kgf/cm²) was applied to form the aggregates before the aggregates were oven cured for 50-75 minutes at 100° C. The different curing times were required to allow sufficient time for the heat to penetrate and cure the core of the differently sized aggregates.

The dry compressive strength of one pellet for each size was assessed and the remaining pellets for each size were immersed in water for 3 days before their wet compressive strength was assessed. The results of the experiment are shown below:

|  |  | Pellet Number | | | | | | | |
|---|---|---|---|---|---|---|---|---|---|
|  |  | 1 | 2 | 3 | 4 | 5 | 6 | 7 | 8 |
| Pressure applied | kPa | 6000 | 6000 | 6000 | 6000 | 6000 | 6000 | 6000 | 6000 |
| Time in Oven | mins | 50 | 50 | 55 | 55 | 60 | 60 | 75 | 75 |
| Oven temp | deg C. | 100 | 100 | 100 | 100 | 100 | 100 | 100 | 100 |
| Pellet Diameter | mm | 12.0 | 12.0 | 13.8 | 13.8 | 20.0 | 20.0 | 23.7 | 23.7 |
| Pellet Thickness height) | mm | 11.60 | 11.50 | 11.05 | 11.15 | 10.80 | 10.90 | 12.85 | 12.75 |
| OD Weight of Pellet | gm | 2.12 | 2.13 | 2.62 | 2.63 | 5.30 | 5.34 | 8.7 | 8.66 |
| Density of Cured Stone | gm/cc | 1.62 | 1.64 | 1.58 | 1.58 | 1.56 | 1.56 | 1.53 | 1.54 |
| Compressive Strength - DRY | mPa | >20 |  | >20 |  | >20 |  | >20 |  |
| Immersion time | days |  | 3 days |  | 3 days |  | 3 days |  | 3 days |
| Compressive Strength - WET | mPa |  | 19 |  | >20 |  | 20 |  | >20 |

The present applicant also formed two rectangular aggregates from the aforementioned aggregate composition. The rectangular aggregates had dimensions of 60 mm×34 mm and were formed by applying a pressure of 61 kgf/cm² and curing in the oven for 85 minutes at 100° C.

The dry compressive strength of one of the rectangular aggregates was assessed and the remaining rectangular aggregate was immersed in water for 15 days before its wet compressive strength was assessed. The results of the experiment are shown below:

| Sample Number |  | 1 | 2 |
|---|---|---|---|
| Pressure applied | kgf/cm² | 61 | 61 |
| Time in Oven | mins | 85 | 85 |
| Oven temp | deg C | 100 | 100 |
| Pellet Dimensions | mm | 60 × 34 | 60 × 34 |
| Pellet Thickness height) | mm | 11.95 | 11.95 |
| OD Weight of Pellet | gm | 38.77 | 39.10 |
| Density of Cured Stone | gm/cc | 1.59 | 1.60 |
| Compressive Strength-DRY | mPa | >20 |  |
| Immersion time | days |  | 15 |
| Compressive Strength-WET | mPa |  | >20 |

The rectangular aggregates showed excellent compressive strength when dry and after immersion in water for 15 days.

The above results show that the aggregates can be produced in a range of sizes and still have excellent dry and wet compressive strengths.

In embodiments where the aggregate is used as a substitute for crushed rock or stone, for example in concrete, the aggregate pieces may be formed in size dimensions that correlate to the size dimensions of the crushed rock or stone that is used in a typical concrete application. Accordingly, in one embodiment, the diameter of the aggregate pieces is typically not more than about 30 mm and the aggregate pieces will generally have a maximum diameter of not less than about 2 mm.

Aggregate pieces of a range of sizes may be produced to provide an aggregate material having a size range distribution.

The required range of aggregate pieces may be formed by breaking or crushing larger pieces of geopolymer into smaller pieces of aggregate. Such larger pieces of geopolymer may be referred to as a "geopolymer mass". The geopolymer mass in this case may be in the form of a sheet, bar, rod, block, slab, tile or otherwise. The size of geopolymer mass may be of any size that is divisible into a plurality of pieces, corresponding to aggregate pieces of sizes described herein. The cross-sectional dimensions of the geopolymer mass are not limited, and may be square, rectangular, round or of any other regular or irregular shape.

It is also possible to form the geopolymer mass into articles of a specific shape that is not intended to be further broken down into smaller pieces. Thus, the geopolymer mass may be in the form of a sheet, bar, rod, block, slab, tile or otherwise. Such geopolymer products may be used in building or other applications, as tiles, pavers, benchtops, benches, consoles, tabletops, fireplace hearths or otherwise.

In the case of aggregate usage, in view of the possibility that the aggregate pieces may have ranging sizes, an average piece size for a quantity of aggregate may be determined. If the aggregate is formed from elongate columns of square, round or other cross-section, with the cross-sectional (maximum) diameter being X, and the columns are broken into smaller aggregate pieces of this diameter (or smaller through fracture across the cross-sectional area), it will be understood that the diameter of the broken or crushed product is less than the column diameter X. In some embodiments, the aggregate comprises crushed or broken pieces of aggregate of an original cross-sectional diameter of not more than 30 mm, not more than 28 mm, not more than 26 mm, not more than 24 mm, not more than 22 mm or not more than 20 mm. In other embodiments, for a given quantity of aggregate, the (number) average particle size is preferably not more than 30 mm in diameter, preferably not more than 28 mm, not more than 26 mm, not more than 24 mm, not more than 22 mm, not more than 20 mm. The average particle size in either case is preferably at least 2 mm, at least 4 mm, at least 6 mm or at least 8 mm or at least 10 mm. Any minimum and maximum value can be combined to identify a range of minimum to maximum average particle size.

The aggregates may be of any shape (or cross-sectional shape) that is suitable for their intended use. In one embodiment, it may be preferable that the aggregate is shaped in a way that enables multiple aggregates to pack or interlock. For example, if the aggregate is used in concrete, aggregates that pack or interlock may reduce the amount of voids in the concrete and therefore reduce the amount of filler required. Accordingly, in one embodiment, the aggregate is in the shape of a 3-pointed star, a dog bone, a rectangle or a cylinder. In another embodiment, the aggregate may be in the shape of a block, a sheet, a panel, a roof shingle, a stud or a brick. In one particular embodiment, the aggregate is cylindrical.

The weight and size of the cured aggregate, as well as other factors such as the pressure applied, will affect the density of the cured aggregate. Similarly, these factors will affect the density of the geopolymer (or geopolymer mass).

In one embodiment, the geopolymer or aggregate has a density of about 1.40 g/cm$^3$ to about 1.80 g/cm$^3$. For example, the aggregate may have a density of about 1.45 g/cm$^3$ to about 1.75 g/cm$^3$, or about 1.50 g/cm$^3$ to about 1.70 g/cm$^3$, or about 1.55 g/cm$^3$ to about 1.65 g/cm$^3$. In one embodiment, the aggregate has a density of about 1.50 g/cm$^3$ to about 1.60 g/cm$^3$. For example, the aggregate may have a density of about 1.50 g/cm$^3$, 1.51 g/cm$^3$, 1.52 g/cm$^3$, 1.53 g/cm$^3$, 1.54 g/cm$^3$, 1.55 g/cm$^3$, 1.56 g/cm$^3$, 1.57 g/cm$^3$, 1.58 g/cm$^3$, 1.59 g/cm$^3$ or 1.60 g/cm$^3$. In one particular embodiment, the aggregate has a density of about 1.56 g/cm$^3$.

It may alternatively be stated that the geopolymer or aggregate has a density of at least about 1.40 g/cm$^3$. For example, the aggregate may have a density of at least about 1.45 g/cm$^3$, or at least about 1.50 g/cm$^3$, or at least about 1.55 g/cm$^3$. In one embodiment, the aggregate has a density of at least about 1.50 g/cm$^3$. For example, the aggregate may have a density of at least about 1.50 g/cm$^3$, 1.51 g/cm$^3$, 1.52 g/cm$^3$, 1.53 g/cm$^3$, 1.54 g/cm$^3$, 1.55 g/cm$^3$, 1.56 g/cm$^3$, 1.57 g/cm$^3$, 1.58 g/cm$^3$, 1.59 g/cm$^3$ or 1.60 g/cm$^3$. In one particular embodiment, the aggregate has a density of at least about 1.56 g/cm$^3$.

As another alternative, it may be stated that the geopolymer or aggregate has a density of up to about 1.40 g/cm$^3$. For example, the aggregate may have a density of up to about 1.75 g/cm$^3$, or up to about 1.70 g/cm$^3$, or up to about 1.65 g/cm$^3$. In one embodiment, the aggregate has a density of up to about 1.60 g/cm$^3$. For example, the aggregate may have a density of up to about 1.50 g/cm$^3$, 1.51 g/cm$^3$, 1.52 g/cm$^3$, 1.53 g/cm$^3$, 1.54 g/cm$^3$, 1.55 g/cm$^3$, 1.56 g/cm$^3$, 1.57 g/cm$^3$, 1.58 g/cm$^3$, 1.59 g/cm$^3$ or 1.60 g/cm$^3$. In one particular embodiment, the aggregate has a density of up to about 1.56 g/cm$^3$.

Strengths of Aggregates

Compressive strength of an aggregate is essential if the aggregate is going to be used for concrete in particular. Compressive strength is also very important for other non-aggregate applications for the geopolymer. It is especially important that the aggregate has a high compressive strength when wet. This is because, concrete is made with water and a low aggregate compressive strength when wet will lead to weakening of the concrete before the concrete has even set. Furthermore, most applications of concrete will result in the concrete getting wet, for example, buildings, pavements and bridges are all subject to rain. Therefore, using aggregate with a low compressive strength when wet will lead to weak concrete which will not be structurally sound.

The present applicant has conducted a number of experiments demonstrating that aggregates formed with the composition outlined above and under the processing conditions outlined above have excellent compressive strength when wet and that this compressive strength is retained even when the aggregate has been immersed in water for a long period of time.

In one series of experiments, 80.4% fly ash, 5.6% kaolin, 7% NaOH and 7% water (as a 50% w/w aqueous solution) was formed into 12 cylindrical aggregates (pellets). The aggregate composition was subjected to a pressure of 5500 kPa before being cured in an oven for 60 minutes at 100° C. The aggregate composition had a Si:Al atomic ratio of 4.81. The dry compressive strength of one aggregate was measured and the remaining 11 aggregates were immersed in water for varying amounts of time before their wet compressive strength was assessed. The results of the experiment are shown below:

|  |  | Pellet Number | | | | | |
| --- | --- | --- | --- | --- | --- | --- | --- |
|  |  | 1 | 2 | 3 | 4 | 5 | 6 |
| Pressure applied | kPa | 5500 | 5500 | 5500 | 5500 | 5500 | 5500 |
| Time in Oven | mins | 60 | 60 | 60 | 60 | 60 | 60 |
| Oven temp | deg C. | 100 | 100 | 100 | 100 | 100 | 100 |
| Pellet Diameter | mm | 20.0 | 20.0 | 20.0 | 20.0 | 20.0 | 20.0 |
| Pellet Thickness (height) | mm | 10.93 | 10.83 | 10.98 | 11.15 | 10.98 | 10.63 |
| OD Weight of Pellet | gm | 5.35 | 5.39 | 5.41 | 5.47 | 5.38 | 5.23 |
| Density of Cured Stone | gm/cc | 1.56 | 1.58 | 1.57 | 1.56 | 1.56 | 1.57 |
| Compressive Strength - DRY | mPa | >20 |  |  |  |  |  |
| Immersion time |  |  | 2 mins | 11 hrs | 17 hrs | 3½ days | 7 days |
| Compressive Strength - WET | mPa |  | >20 | >20 | >20 | 20 | >20 |

-continued

|  |  | \multicolumn{6}{c|}{Pellet Number} |
|---|---|---|---|---|---|---|---|
|  |  | 7 | 8 | 9 | 10 | 11 | 12 |
| Pressure applied | kPa | 5500 | 5500 | 5500 | 5500 | 5500 | 5500 |
| Time in Oven | mins | 60 | 60 | 60 | 60 | 60 | 60 |
| Oven temp | deg C. | 100 | 100 | 100 | 100 | 100 | 100 |
| Pellet Diameter | mm | 20.0 | 20.0 | 20.0 | 20.0 | 20.0 | 20.0 |
| Pellet Thickness (height) | mm | 11.30 | 11.10 | 10.65 | 11.25 | 11.10 | 11.23 |
| OD Weight of Pellet | gm | 5.57 | 5.51 | 5.18 | 5.56 | 5.4 | 5.54 |
| Density of Cured Stone | gm/cc | 1.57 | 1.58 | 1.55 | 1.57 | 1.55 | 1.57 |
| Compressive Strength - DRY | mPa |  |  |  |  |  |  |
| Immersion time |  | 11 days | 14 days | 18 days | 21 days | 25 days | 28 days |
| Compressive Strength - WET | mPa | >20 | >20 | 18 | 19 | 20 | 20 |

In another series of experiments, 80.4% fly ash, 5.6% kaolin, 7% NaOH and 7% water (as a 50% w/w aqueous solution) was formed into 12 cylindrical aggregates (pellets). The aggregate composition was subjected to a pressure of 7000 kPa before being cured in an oven for 60 minutes at 100° C. The aggregate composition had a Si:Al atomic ratio of 4.81. The dry compressive strength of one aggregate was measured and the remaining 11 aggregates were immersed in water for varying amounts of time before their wet compressive strength was assessed. The results of the experiment are shown below:

|  |  | \multicolumn{6}{c|}{Pellet Number} |
|---|---|---|---|---|---|---|---|
|  |  | 13 | 14 | 15 | 16 | 17 | 18 |
| Pressure applied | kPa | 7000 | 7000 | 7000 | 7000 | 7000 | 7000 |
| Time in Oven | mins | 60 | 60 | 60 | 60 | 60 | 60 |
| Oven temp | deg C. | 100 | 100 | 100 | 100 | 100 | 100 |
| Pellet Diameter | mm | 20.0 | 20.0 | 20.0 | 20.0 | 20.0 | 20.0 |
| Pellet Thickness (height) | mm | 12.10 | 12.15 | 12.10 | 12.05 | 12.20 | 12.40 |
| OD Weight of Pellet | gm | 6.15 | 6.13 | 6.11 | 6.07 | 6.18 | 6.23 |
| Density of Cured Stone | gm/cc | 1.62 | 1.61 | 1.61 | 1.60 | 1.61 | 1.60 |
| Compressive Strength - DRY | mPa | >20 |  |  |  |  |  |
| Immersion time |  |  | 2 mins | 11 hrs | 17 hrs | 3½ days | 7 days |
| Compressive Strength - WET | mPa |  | >20 | 20 | >20 | 20 | >20 |

In another series of experiments, 80.4% fly ash, 5.6% kaolin, 7% NaOH and 7% water (as a 50% w/w aqueous solution) was formed into 10 cylindrical aggregates (pellets). The aggregate composition was subjected to a pressure of 6000 kPa before being cured in an oven for 57 minutes at 100° C. The aggregate composition had a Si:Al atomic ratio of 4.81.

The aggregates were divided into 5 pairs. The dry compressive strength of one aggregate from each pair was assessed and the other aggregate from each pair was immersed in water for a period of time before its wet

|  |  | \multicolumn{6}{c|}{Pellet Number} |
|---|---|---|---|---|---|---|---|
|  |  | 19 | 20 | 21 | 22 | 23 | 24 |
| Pressure applied | kPa | 7000 | 7000 | 7000 | 7000 | 7000 | 7000 |
| Time in Oven | mins | 60 | 60 | 60 | 60 | 60 | 60 |
| Oven temp | deg C. | 100 | 100 | 100 | 100 | 100 | 100 |
| Pellet Diameter | mm | 20.0 | 20.0 | 20.0 | 20.0 | 20.0 | 20.0 |
| Pellet Thickness (height) | mm | 12.20 | 12.50 | 12.35 | 11.95 | 12.20 | 12.50 |
| OD Weight of Pellet | gm | 6.21 | 6.34 | 6.26 | 5.95 | 6.10 | 6.20 |
| Density of Cured Stone | gm/cc | 1.62 | 1.61 | 1.61 | 1.58 | 1.59 | 1.58 |
| Compressive Strength - DRY | mPa |  |  |  |  |  |  |
| Immersion time |  | 11 days | 14 days | 18 days | 21 days | 25 days | 28 days |
| Compressive Strength - WET | mPa | >20 | >20 | 20 | >20 | >20 | 20 | compressive strength was assessed. The results of the experiment are shown below:

|  |  | Pellet Number | | | | | |
| --- | --- | --- | --- | --- | --- | --- | --- |
|  |  | 1 | 2 | 3 | 4 | 5 | 6 |
| Pressure applied | kPa | 6000 | 6000 | 6000 | 6000 | 6000 | 6000 |
| Time in Oven | mins | 57 | 57 | 57 | 57 | 57 | 57 |
| Oven temp | deg C. | 100 | 100 | 100 | 100 | 100 | 100 |
| Pellet Diameter | mm | 20.0 | 20.0 | 20.0 | 20.0 | 20.0 | 20.0 |
| Pellet Thickness height) | mm | 10.30 | 11.00 | 10.80 | 10.30 | 11.25 | 11.35 |
| OD Weight of Pellet | gm | 5.05 | 5.38 | 5.27 | 5.05 | 5.51 | 5.58 |
| Density of Cured Stone | gm/cc | 1.56 | 1.56 | 1.55 | 1.56 | 1.56 | 1.56 |
| Compressive Strength - DRY | mPa | >20 |  | >20 |  | >20 |  |
| Immersion time | days |  | 6 days |  | 19 days |  | 37 days |
| Compressive Strength - WET | mPa |  | 20 |  | >20 |  | 20 |

|  |  | Pellet Number | | | | | |
| --- | --- | --- | --- | --- | --- | --- | --- |
|  |  | 7 | 8 | 9 | 10 | 11 | 12 |
| Pressure applied | kPa | 6000 | 6000 | 6000 | 6000 | 6000 | 6000 |
| Time in Oven | mins | 57 | 57 | 57 | 57 | 57 | 57 |
| Oven temp | deg C. | 100 | 100 | 100 | 100 | 100 | 100 |
| Pellet Diameter | mm | 20.0 | 20.0 | 20.0 | 20.0 | 20.0 | 20.0 |
| Pellet Thickness height) | mm | 11.20 | 11.10 | 11.80 | 10.95 | 10.5 | 11.08 |
| OD Weight of Pellet | gm | 5.47 | 5.40 | 5.74 | 5.40 | 5.15 | 5.50 |
| Density of Cured Stone | gm/cc | 1.55 | 1.55 | 1.55 | 1.57 | 1.56 | 1.58 |
| Compressive Strength - DRY | mPa | >20 |  | >20 |  | >20 |  |
| Immersion time | days |  | 69 days |  | 425 days |  | 808 days |
| Compressive Strength - WET | mPa |  | >20 |  | >20 |  | >20 |

The above results show that the aggregate described above and the aggregate produced by the method described above have excellent dry compressive strength and excellent wet compressive strength even after more than 2 years (808 days) immersion in water.

In the experiments conducted by the present applicant, compressive strength was determined by applying a force via a 5 mm diameter rod to a sample which has been placed over a load cell. The apparatus had a limited load capacity of 20 mPa, so samples which did not crush within the maximum capacity of the load cell were recorded as >20 mPa.

To confirm the actual compressive strength of their geopolymer aggregate, the applicant had RMIT University in Australia produce a 20 cm×20 cm square×20 mm thick slab of geopolymer aggregate made from their geopolymer aggregate composition and produced by the method described above. Cylindrical sections were core cut from the slab to produce samples of 10 mm in diameter and 20 mm high. These samples were then tested for compressive strength using a load press.

In one embodiment, eight (8) cored samples of the aggregate had an average compressive strength, (dry compressive strength) of about 67 mPa. In another embodiment, another eight (8) cored samples of the aggregate had an average compressive strength, (wet compressive strength) after soaking in water of about 35 mPa. In this case, the term soaking in water means that the aggregate had been immersed in water for a period of seven (7) days before testing.

It is understood that the wet compressive strength of the geopolymer aggregate will be less than its dry compressive strength. The objective of the applicant's geopolymer aggregate composition is to maximise the wet compression strength and ensure that that strength is maintained in the long term as is necessary for its use as an aggregate in concrete.

In a separate experiment, another pellet sample that had previously been produced by the applicant and immersed in water for 808 days was tested by RMIT University and had a wet compressive strength of 35 mPa, demonstrating that the applicant's geopolymer aggregate will maintain its compressive strength over time even if continuously immersed in water.

Uses of the Aggregates

The aggregates described above or prepared by the method described above may be used in any application for which aggregates are typically used. Accordingly, in one embodiment, there is provided an article comprising the geopolymer aggregate described above, or a geopolymer aggregate prepared by the method described above. The geopolymer aggregate may be in the form of a coarse aggregate, or a fine aggregate, or a combination of the two. Coarse aggregate is a term known in the art, and applies to pieces of between about 2 and 50 mm in size. Similarly, fine aggregate applies to finely crushed rock or stone pieces, or sand, of particle size less than about 2 mm in size. Coarse aggregates are of particular interest. There is also provided use of the geopolymer aggregate described above, or a geopolymer aggregate prepared by the method described above, as an article. In one embodiment, the article is selected from the group consisting of tiles, benchtops, building elements, sheeting, slabs, replacement pre-formed stone-like materials, roof tile, tooling mould (die), a block, a sheet, a brick and a panel. Obviously in the case of an article, the size constraints described above for aggregates do not apply.

The present applicant has conducted experiments to show that the geopolymer aggregate can be successfully used in concrete.

In the experiment, concrete made with crushed geopolymer aggregate was compared with concrete made with crushed granite rock aggregate. In both cases a test cube of concrete was prepared using a water/cement ratio of 0.42 and tested according to the standard BS EN 12390-3. The results of the experiment are shown below:

|  | Compressive Strength (mPa) | | | |
| --- | --- | --- | --- | --- |
|  | 7 days | 28 days | 90 days | Target |
| Concrete made with crushed geopolymer aggregate | 30.0 | 35.8 | 41.0 | 40 |
| Concrete made with crushed granite rock aggregate | 29.2 | 39.0 | 45.4 | 40 |

The concrete made with crushed geopolymer aggregate showed excellent compressive strength. Furthermore, the compressive strength after 90 days was above the target compressive strength for structural grade concrete. The results for the concrete made with crushed geopolymer aggregate were comparable with those for the concrete made with crushed granite rock aggregate In one particular embodiment, there is provided concrete comprising the geopolymer aggregate described above, or a geopolymer aggregate prepared by the method described above. In another embodiment, there is provided use of the geopolymer aggregate described above, or a geopolymer aggregate prepared by the method described above as a component of concrete. In one embodiment, the concrete comprises, by weight, about 55% to about 75% geopolymer aggregate. For example, the concrete may comprise, by weight, about 60% to about 70% geopolymer aggregate. In one embodiment, the concrete comprises, by weight, about 65% geopolymer aggregate.

In one embodiment, concrete comprising the aggregate is up to about 20% less dense than normal concrete. The concrete prepared using the aggregate described above is therefore lighter than normal concrete whilst having comparable dry and wet compressive strengths. This provides the concrete prepared using the aggregate described above with significant advantages including savings in transport and handling of precast concrete units, reduction in dead loads making savings in foundations and reinforcement and reduction in cost for formwork and propping.

Production Steps

FIG. 1 is a schematic illustration of the steps that may be involved in the production of the aggregate or aggregate products in accordance with embodiments of the present invention.

Fly ash (or fly ash substitute) is stored in storage silos (1a, 1b) and kaolin (or other aluminium phyllosilicate) in an additional storage silo (2). The provision of more than one storage silo for the fly ash allows for different grades or sources of fly ash to be stored and used selectively in the production of the desired final product. (Fly ash is commonly sold as fly ash from a particular geographical location.) Additionally, the provision of more than one silo allows for redundancy in the event of pump breakdown or blockage.

The dry powder ingredients, typically fly ash and kaolin, are pre-mixed in a powder mixer (3). This may be of any type, such as a fluid bed drier of suitable capacity. Caustic (the combination of alkaline component and water) is stored in a liquid storage tank (4), which is kept heated and insulated. The mixed dry components are then mixed with the required quantity of caustic in pre-mixer (5). The pre-mixer (5) may be of any suitable type such as a cone crusher. The pre-mixed composition is then mixed further in mixer (6). The mixer (6), which may be in the form of a blender, may be of any suitable type, such as a granulator with oscillating rotor, a ribbon blender, or otherwise.

Figure 2:
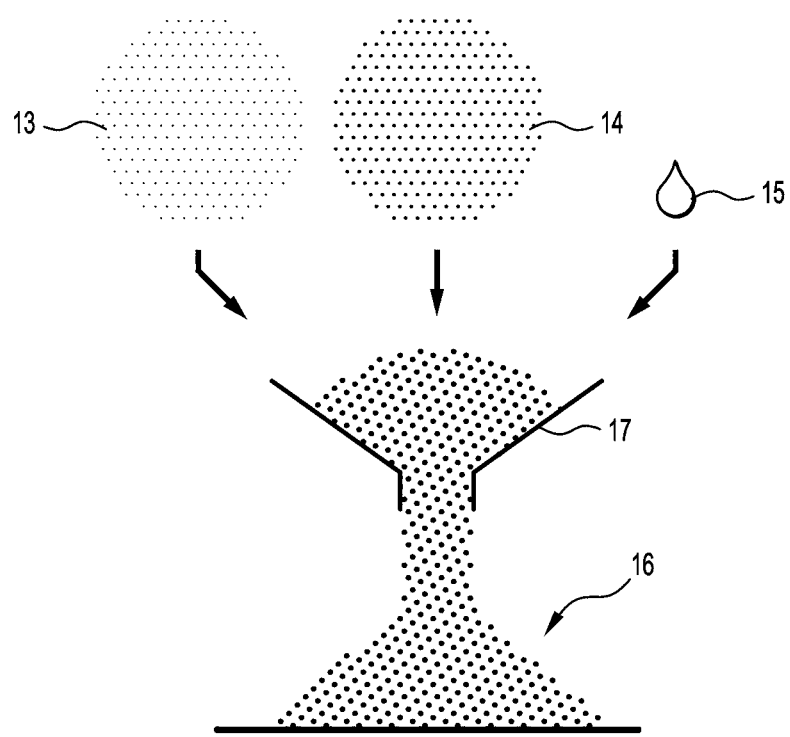
FIG. 2 is an illustration showing the appearance and flowable powder nature of the geopolymer composition formed from the input components.

As illustrated in FIG. 2, the dry powder ingredients, the fly ash (13) and kaolin (14) are fine particulate free-flowing materials. The caustic (water and alkaline component) is in liquid form (15). When mixed in the mixer (6), the mixed product is in the form of a sparingly damp, free-flowing powder (16). The mixture is not in the form of a slurry or paste, which contains a significantly higher water content than that of the present mixture. The water content is important in the production of this powder form of aggregate composition, as it impacts on the physical form of the composition, and impacts on the product that is produced from the composition following the pressing and curing steps.

The product mixed in mixer (6), in slightly damp, free-flowing powder form (7), is then directed into a compression step in a press (8) or (8a). There are two main options for performing the compression step. One option and the following stages is indicated by the solid arrows, and a second option with the alternative processing steps is indicated by the broken arrows.

The first option involves pressing a larger volume of the mixture in powder form in press (7) into a compacted mass of larger size (8). Multiple compacted masses can be compacted in this step at the same time. The other option involves pressing smaller volumes of mixture in press (7) to form compacted pieces (8a) or pellets of a smaller size than the mass volumes. Multiple compacted pieces can be prepared by pressing/compaction at the same time. The pieces may be of the same size, or the pieces may be of multiple sizes. Any suitable press capable of applying the required pressure (compression force) uniformly to the geopolymer composition can be used, such as a hydraulic press, briquetting roll press with flat rollers, tablet press, roll mill (such as a twin roll mill), or otherwise.

In each case, after compaction, the compacted mass or compacted pieces are cured (or dried and cured) in a curing oven (9) or (9a). The oven may be of any suitable type, such as a conveyor oven. Curing results in the generation of the geopolymer from the components in the mixture. Until curing is performed, the compacted mixture is capable of being fractured or broken with the application of minimal force, such as snapping by hand. After curing, however, the cured composition is stone-like, and is not capable of being snapped or broken by hand.

In the case of the compacted pieces (8a), these are converted into a geopolymer aggregate, in piece form, following curing. Accordingly, there is no need to further process the cured product which is already in piece form suitable for use as an aggregate, although the option exists to further fragment these geopolymer aggregate pieces.

Figure 3:
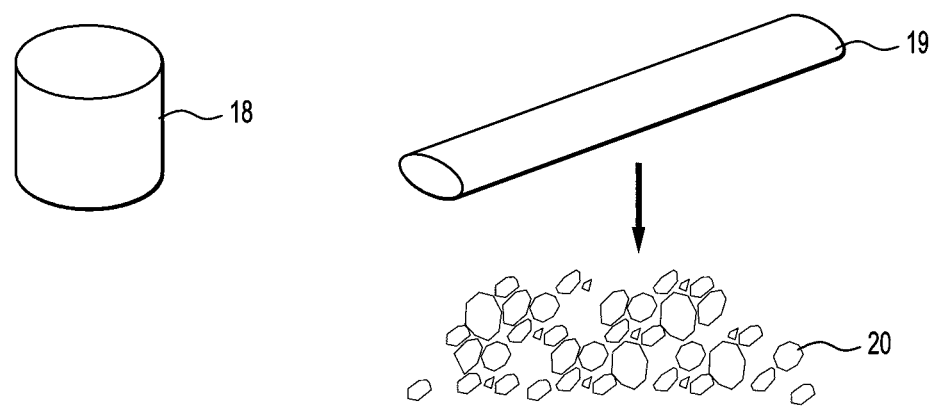
FIG. 3 is an illustration of two different forms of geopolymer according to two embodiments of the invention, and the geopolymer aggregate which may be formed from the geopolymer.

In the case of the compacted masses (8), curing results in the formation of geopolymer masses. These geopolymer masses may be crushed in a crusher (10), followed by sieving (11) into fractions of selected size. Sieving is optional, but is typically performed. The conversion of a geopolymer mass, in rod form (19) into fragments (20) through crushing is shown in greater detail in FIG. 3. The fragments, which constitute the aggregate, may be stockpiled (12) ready for use. The stockpiling may be in a range of fractions or size ranges.

Balancing of Factors in the Production of Geopolymers and Geopolymer Aggregates

It is noted that for the production of the most effective geopolymers and aggregates in accordance with the present invention, a combination of the above processing conditions and requirements are highly desired.

In preferred embodiments, the geopolymer comprises at least two, and preferably 3, 4, 5, 6, 7 or all of the following features in combination, being features of the mixture used in the production of the geopolymer, or processing conditions for the formation of the geopolymer from the mixture:

a water content of about 6% to about 10% by weight of the mixture;

an alkaline component content of between 6% and 10% by weight of the mixture;

an alkaline component molar concentration of about 15M to 23M NaOH aqueous solution (or hydroxide molar equivalent of an alternative alkaline material) used in the formation of the mixture, corresponding to about 1.375-2.1 moles of hydroxide ion per kilogram of mixture;

an alkaline component concentration (as an aqueous solution) in the mixture of 40% (w/w) to 60% (w/w);

an atomic ratio of silicon to aluminium between 4.60 to 5.10;

a particle size of dry powder ingredients such that 80% of the particles by volume are less than 1000 μm in size (or any of the other particle size limitations described previously);

a compression force of about 50 to about 90 kgf/cm$^2$ applied in the compression of the mixture to form a compressed mixture;

heat curing of the compressed mixture at a temperature of between about 80° C. and 150° C.;

heat curing at the above stated temperature for sufficient time for the heat to fully penetrate the compressed mixture, such as for a time period of between 20 minutes and 4 hours.

The provision of at least 5, preferably at least 6, 7, 8, or all of these features contributes significantly to the balance of conditions required to produce the most effective geopolymers and aggregates. In each case, the feature may be more specifically limited within the ranges described previously. Thus, as one example, the Si:Al ratio may be between about 4.76 to about 4.84, as described above.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

First Item Listing

1. A geopolymer aggregate composition comprising fly ash, an aluminium phyllosilicate, an alkaline component and water, wherein the water is present at an amount of about 6% to about 10% by weight of the composition.

2. The geopolymer aggregate composition according to item 1, wherein the water is present at an amount of about 6% to about 8% by weight of the composition.

3. The geopolymer aggregate composition according to item 1 or 2, wherein the alkaline component is present at an amount of about 6% to about 10% by weight of the composition.

4. The geopolymer aggregate composition according to any one of items 1 to 3, wherein the alkaline component is present as about a 50% (w/w) solution in the water.

5. The geopolymer aggregate composition according to any one of items 1 to 4, wherein the aggregate composition comprises silicon and aluminium in a ratio of about 4.60 to about 5.10.

6. The geopolymer aggregate composition according to item 5, wherein the ratio is about 4.75 to 4.85.

7. The geopolymer aggregate composition according to any one of items 1 to 6, wherein the aggregate composition comprises by weight about 77% to about 84% fly ash, about 4% to about 7% kaolin and about 6% to about 10% alkaline component.

8. The geopolymer aggregate composition according to any one of items 1 to 7, wherein the alkaline component is selected from the group consisting of KOH, NaOH and a mixture thereof.

9. The geopolymer aggregate composition according to any one of items 1 to 8, wherein the aggregate has a compressive strength when dry of at least about 20 mPa.

10. The geopolymer aggregate composition according to any one of items 1 to 9, wherein the aggregate has a compressive strength after soaking in water of at least about 20 mPa.

11. A geopolymer aggregate produced from the geopolymer aggregate composition according to any one of items 1 to 10.

12. Use of the geopolymer aggregate composition according to any one of items 1 to 10 to produce a geopolymer aggregate.

13. A method of producing a geopolymer aggregate comprising:
   i) forming fly ash, an aluminium phyllosilicate, an alkaline component and water into an aggregate composition, wherein the water is present at an amount of about 6% to about 10% by weight of the aggregate composition;
   ii) applying a pressure to the aggregate composition to form an aggregate; and
   iii) curing the aggregate.

14. The method according to items 13, wherein the pressure applied to the aggregate is about 50 to about 90 kgf/cm$^2$.

15. A method of producing a geopolymer aggregate comprising:
   i) forming fly ash, an aluminium phyllosilicate, an alkaline component and water into an aggregate composition;
   ii) applying a pressure of about 50 to about 90 kgf/cm$^2$ to the aggregate composition to form an aggregate; and
   iii) curing the aggregate.

16. The method according to items 15, wherein the aggregate composition comprises by weight about 6% to about 10% of water.

17. The method according to any one of items 13 to 16, wherein the aggregate composition comprises silicon and aluminium in a ratio of about 4.60 to about 5.10.

18. The method according to item 17, wherein the ratio is about 4.75 to 4.85.

19. The method according to any one of items 13 to 18, wherein the aggregate composition comprises by weight about 77% to about 84% fly ash, about 4% to about 7% kaolin and about 6% to about 10% alkaline component.
20. The method according to any one of items 13 to 19 wherein the aggregate is heat cured.
21. The method according to any one of items 13 to 20, wherein the aggregate has a compressive strength when dry of at least about 20 mPa.
22. The method according to any one of items 13 to 21, wherein the aggregate has a compressive strength after soaking in water of at least about 20 mPa.
23. A geopolymer aggregate produced by the method of any one of items 13 to 22.
24. Use of the geopolymer aggregate according item 11 or 23 as a component of concrete.
25. An article comprising the geopolymer aggregate according to item 11 or 23.
26. The article according to item 25, where in the article is selected from the group consisting of a roof tile, tooling mould, concrete, a block, a sheet, a brick and a panel.
27. Concrete comprising the geopolymer aggregate according to item 11 or 23.

Second Item Listing

1. A geopolymer composition comprising fly ash, an aluminium phyllosilicate, an alkaline component and water, wherein the water is present at an amount of about 6% to about 10% by weight of the composition.
2. The geopolymer composition according to item 1, wherein the water is present at an amount of about 6% to about 8% by weight of the composition.
3. The geopolymer composition according to item 1 or 2, wherein the alkaline component is present at an amount of about 6% to about 10% by weight of the composition.
4. The geopolymer composition according to any one of the preceding items, wherein the alkaline component is present as an aqueous solution of a concentration between about a 40% (w/w) and 60% (w/w).
5. The geopolymer composition according to any one of the preceding items, wherein the alkaline component is present in the composition in an amount that provides 1.375-2.1 moles of hydroxide per kilogram of the composition.
6. The geopolymer composition according to any one of the preceding items, wherein the alkaline component is selected from the group consisting of KOH, NaOH and a mixture thereof.
7. The geopolymer composition according to any one of the preceding items, wherein the composition comprises silicon and aluminium in a ratio of about 4.60 to about 5.10.
8. The geopolymer composition according to item 7, wherein the ratio is about 4.75 to 4.85.
9. The geopolymer composition according to any one of the preceding items, wherein the composition comprises by weight about 77% to about 84% fly ash, about 4% to about 7% aluminium phyllosilicate and about 6% to about 10% alkaline component.
10. The geopolymer composition according to any one of items 1 to 8, wherein the composition comprises by weight about 77% to about 84% fly ash, about 4% to about 7% kaolin and about 6% to about 10% alkaline component.
11. The geopolymer composition according to any one of the preceding items, wherein the particle size of the dry powder ingredients is such that 80% of the particles by volume are less than 1000 μm in size.
12. The geopolymer composition according to any one of the preceding items, wherein the dry powder ingredients have a fineness of between 85% and 99% as measured using AS 3582.1.
13. The geopolymer composition according to any one of the preceding items, comprising fly ash.
14. The geopolymer composition according to any one of the preceding items, wherein the geopolymer composition is a geopolymer aggregate composition.
15. The geopolymer composition according to any one of the preceding items, wherein the geopolymer composition is substantially free of crushed rock or stone.
16. The geopolymer composition according to any one of the preceding items, wherein the geopolymer composition is substantially free of cement.
17. A geopolymer produced from the geopolymer composition according to any one of items 1 to 16.
18. A geopolymer aggregate produced from the geopolymer aggregate composition according to item 14.
19. A geopolymer comprising a cured, compacted combination of fly ash, an aluminium phyllosilicate, an alkaline component and water, wherein the water constituted 6% to 10% of the combination prior to curing.
20. The geopolymer of item 19, which is in the form of a geopolymer aggregate.
21. A geopolymer aggregate comprising pieces of a cured compacted combination of fly ash, an aluminium phyllosilicate, an alkaline component and water, wherein the water is present at an amount of about 6% to about 10% by weight of the combination prior to curing.
22. The geopolymer aggregate of item 23, wherein the combination comprises fly ash.
23. The geopolymer or geopolymer aggregate according to any one of items 19 to 22, wherein the alkaline component is present at an amount of about 6% to about 10% by weight of the combination prior to curing.
24. The geopolymer or geopolymer aggregate according to any one of items 19 to 23, wherein the alkaline component is present in the combination as an aqueous solution of a concentration between about a 40% (w/w) and 60% (w/w) prior to curing.
25. The geopolymer or geopolymer aggregate according to any one of items 19 to 24, wherein the alkaline component is present in an amount that provides 1.375-2.1 moles of hydroxide per kilogram of the combination prior to curing.
26. The geopolymer or geopolymer aggregate according to any one of items 19 to 25, wherein the alkaline component is selected from the group consisting of KOH, NaOH and a mixture thereof.
27. The geopolymer or geopolymer aggregate according to any one of items 19 to 26, wherein the combination comprises silicon and aluminium in a ratio of about 4.60 to about 5.10.
28. The geopolymer composition according to item 27, wherein the ratio is about 4.75 to 4.85.
29. The geopolymer or geopolymer aggregate according to any one of items 19 to 28, wherein the combination comprises by weight about 77% to about 84% fly ash, about 4% to about 7% aluminium phyllosilicate and about 6% to about 10% alkaline component, prior to curing.
30. The geopolymer or geopolymer aggregate according to any one of items 19 to 29, wherein the combination comprises by weight about 77% to about 84% fly ash, about 4% to about 7% kaolin and about 6% to about 10% alkaline component prior to curing.

31. The geopolymer or geopolymer aggregate according to any one of items 19 to 30, wherein the particle size of the dry powder ingredients in the combination is such that 80% of the particles by volume are less than 1000 μm in size, prior to curing.
32. The geopolymer or geopolymer aggregate according to any one of items 19 to 31, wherein the dry powder ingredients in the combination have a fineness of between 85% and 99% as measured using AS 3582.1, prior to curing.
33. The geopolymer or geopolymer aggregate according to any one of items 17 to 32, comprising at least 5 of the following features:
   an alkaline component content of between 6% and 10% by weight of the combination prior to curing;
   an alkaline component content that provides about 1.375-2.1 moles of hydroxide ion per kilogram of the combination prior to curing;
   an alkaline component concentration in the combination (as an aqueous solution) of 40% (w/w) to 60% (w/w) prior to curing;
   an atomic ratio of silicon to aluminium between 4.60 to 5.10 in the combination;
   a particle size of fly ash and aluminium phyllosilicate such that 80% of the particles by volume are less than 1000 μm in size;
   the application of a compacting force to the combination of about 50 to about 90 kgf/cm$^2$;
   heat curing of the compacted combination at a temperature of between about 80° C. and 150° C.;
   heat curing of the compacted combination for a sufficient time for the heat to fully penetrate the compressed mixture.
34. The geopolymer or geopolymer aggregate according to item 33, comprising all 8 features.
35. The geopolymer or geopolymer aggregate according to any one of items 17 to 34, which is in the form of a geopolymer aggregate consisting of geopolymer.
36. The geopolymer or geopolymer aggregate according to any one of items 17 to 35, having a compressive strength when dry of at least about 20 mPa.
37. The geopolymer or geopolymer aggregate according to any one of items 17 to 36, having a compressive strength after soaking in water of at least about 20 mPa.
38. A method according to producing a geopolymer comprising:
   i) combining fly ash, an aluminium phyllosilicate, an alkaline component and water to form a mixture, wherein the water is present at an amount of about 6% to about 10% by weight of the mixture;
   ii) compacting the mixture by applying pressure; and
   iii) curing the compacted mixture to form the geopolymer.
39. The method according to item 38, comprising compacting the mixture to form a compacted mass, curing the compacted mass to form a geopolymer mass, and breaking the geopolymer mass into geopolymer pieces.
40. The method according to item 38, comprising compacting the mixture to form compacted pieces and curing the compacted pieces to form geopolymer aggregate.
41. The method according to any one of items 38 to 40, wherein the pressure applied is about 50 to about 90 kgf/cm$^2$
42. A method according to producing a geopolymer comprising:
   i) combining fly ash, an aluminium phyllosilicate, an alkaline component and water to form a mixture;
   ii) compacting the mixture by applying pressure of about 50 to about 90 kgf/cm$^2$; and
   iii) curing the compacted mixture to form the geopolymer.
43. The method according to item 42, comprising combining water in the mixture in an amount of about 6% to about 10% by weight.
44. The method according to any one of items 38 to 43, comprising combining fly ash and aluminium phyllosilicate into the mixture in amounts such that the ratio of silicon to aluminium is about 4.60 to about 5.10.
45. The method according to item 44, wherein the ratio is about 4.75 to 4.85.
46. The method according to any one of items 38 to 45, comprising combining, by weight, about 77% to about 84% fly ash, about 4% to about 7% kaolin and about 6% to about 10% alkaline component.
47. The method according to any one of items 38 to 46, comprising heat curing of the compacted mixture.
48. The method according to any one of items 38 to 47, comprising at least 5 of the following features:
   an alkaline component content of between 6% and 10% by weight of the mixture prior to curing;
   an alkaline component content that provides about 1.375-2.1 moles of hydroxide ion per kilogram of the mixture prior to curing;
   an alkaline component concentration in the mixture (as an aqueous solution) of 40% (w/w) to 60% (w/w) prior to curing;
   an atomic ratio of silicon to aluminium between 4.60 to 5.10 in the mixture;
   a particle size of fly ash, an aluminium phyllosilicate such that 80% of the particles by volume are less than 1000 μm in size;
   the application of a compacting force to the mixture of about 50 to about 90 kgf/cm$^2$;
   heat curing of the compacted mixture at a temperature of between about 80° C. and 150° C.;
   heat curing the compacted mixture for a at the above stated temperature for sufficient time for the heat to fully penetrate the compressed mixture.
49. The method of item 48, comprising all 8 features.
50. The method according to any one of items 38 to 49, comprising forming a geopolymer having a compressive strength when dry of at least about 20 mPa.
51. The method according to any one of items 38 to 50, comprising forming a geopolymer having a compressive strength after soaking in water of at least about 20 mPa.
52. A geopolymer aggregate produced by the method of any one of items 38 to 51.
53. Use of the geopolymer or geopolymer aggregate according to any one of items 17 to 37 and 52 as a component of concrete.
54. An article comprising the geopolymer or geopolymer aggregate according to any one of items 17 to 37 and 52.
55. The article according to item 54, where in the article is selected from the group consisting of tiles, benchtops, building elements, sheeting, slabs, replacement preformed stone-like materials, roof tiles, tooling moulds (die), concrete, blocks, sheets, bricks and panels.
56. Concrete comprising the geopolymer or geopolymer aggregate according to any one of items 17 to 37 and 52.
57. The concrete of item 56, which is substantially free of crushed rock or stone.

Third Item Listing
1. A geopolymer composition comprising a fly ash substitute, an aluminium phyllosilicate, an alkaline component and water, wherein the water is present at an amount of about 6% to about 10% by weight of the composition.
2. The geopolymer composition according to item 1, wherein the water is present at an amount of about 6% to about 8% by weight of the composition.
3. The geopolymer composition according to item 1 or 2, wherein the alkaline component is present at an amount of about 6% to about 10% by weight of the composition.
4. The geopolymer composition according to any one of the preceding items, wherein the alkaline component is present as an aqueous solution of a concentration between about a 40% (w/w) and 60% (w/w).
5. The geopolymer composition according to any one of the preceding items, wherein the alkaline component is present in the composition in an amount that provides 1.375-2.1 moles of hydroxide per kilogram of the composition.
6. The geopolymer composition according to any one of the preceding items, wherein the alkaline component is selected from the group consisting of KOH, NaOH and a mixture thereof.
7. The geopolymer composition according to any one of the preceding items, wherein the composition comprises silicon and aluminium in a ratio of about 4.60 to about 5.10.
8. The geopolymer composition according to item 7, wherein the ratio is about 4.75 to 4.85.
9. The geopolymer composition according to any one of the preceding items, wherein the composition comprises by weight about 77% to about 84% fly ash substitute, about 4% to about 7% aluminium phyllosilicate and about 6% to about 10% alkaline component.
10. The geopolymer composition according to any one of items 1 to 8, wherein the composition comprises by weight about 77% to about 84% fly ash, about 4% to about 7% kaolin and about 6% to about 10% alkaline component.
11. The geopolymer composition according to any one of the preceding items, wherein the particle size of the dry powder ingredients is such that 80% of the particles by volume are less than 1000 μm in size.
12. The geopolymer composition according to any one of the preceding items, wherein the dry powder ingredients have a fineness of between 85% and 99% as measured using AS 3582.1.
13. The geopolymer composition according to any one of the preceding items, comprising fly ash substitute.
14. The geopolymer composition according to any one of the preceding items, wherein the geopolymer composition is a geopolymer aggregate composition.
15. The geopolymer composition according to any one of the preceding items, wherein the geopolymer composition is substantially free of crushed rock or stone.
16. The geopolymer composition according to any one of the preceding items, wherein the geopolymer composition is substantially free of cement.
17. A geopolymer produced from the geopolymer composition according to any one of items 1 to 16.
18. A geopolymer aggregate produced from the geopolymer aggregate composition according to item 14.
19. A geopolymer comprising a cured, compacted combination of fly ash substitute, an aluminium phyllosilicate, an alkaline component and water, wherein the water constituted 6% to 10% of the combination prior to curing.
20. The geopolymer of item 19, which is in the form of a geopolymer aggregate.
21. A geopolymer aggregate comprising pieces of a cured compacted combination of fly ash substitute, an aluminium phyllosilicate, an alkaline component and water, wherein the water is present at an amount of about 6% to about 10% by weight of the combination prior to curing.
22. The geopolymer aggregate of item 23, wherein the combination comprises fly ash substitute.
23. The geopolymer or geopolymer aggregate according to any one of items 19 to 22, wherein the alkaline component is present at an amount of about 6% to about 10% by weight of the combination prior to curing.
24. The geopolymer or geopolymer aggregate according to any one of items 19 to 23, wherein the alkaline component is present in the combination as an aqueous solution of a concentration between about a 40% (w/w) and 60% (w/w) prior to curing.
25. The geopolymer or geopolymer aggregate according to any one of items 19 to 24, wherein the alkaline component is present in an amount that provides 1.375-2.1 moles of hydroxide per kilogram of the combination prior to curing.
26. The geopolymer or geopolymer aggregate according to any one of items 19 to 25, wherein the alkaline component is selected from the group consisting of KOH, NaOH and a mixture thereof.
27. The geopolymer or geopolymer aggregate according to any one of items 19 to 26, wherein the combination comprises silicon and aluminium in a ratio of about 4.60 to about 5.10.
28. The geopolymer composition according to item 27, wherein the ratio is about 4.75 to 4.85.
29. The geopolymer or geopolymer aggregate according to any one of items 19 to 28, wherein the combination comprises by weight about 77% to about 84% fly ash substitute, about 4% to about 7% aluminium phyllosilicate and about 6% to about 10% alkaline component, prior to curing.
30. The geopolymer or geopolymer aggregate according to any one of items 19 to 29, wherein the combination comprises by weight about 77% to about 84% fly ash substitute, about 4% to about 7% kaolin and about 6% to about 10% alkaline component prior to curing.
31. The geopolymer or geopolymer aggregate according to any one of items 19 to 30, wherein the particle size of the dry powder ingredients in the combination is such that 80% of the particles by volume are less than 1000 μm in size, prior to curing.
32. The geopolymer or geopolymer aggregate according to any one of items 19 to 31, wherein the dry powder ingredients in the combination have a fineness of between 85% and 99% as measured using AS 3582.1, prior to curing.
33. The geopolymer or geopolymer aggregate according to any one of items 17 to 32, comprising at least 5 of the following features:
  an alkaline component content of between 6% and 10% by weight of the combination prior to curing;
  an alkaline component content that provides about 1.375-2.1 moles of hydroxide ion per kilogram of the combination prior to curing;
  an alkaline component concentration in the combination (as an aqueous solution) of 40% (w/w) to 60% (w/w) prior to curing;
  an atomic ratio of silicon to aluminium between 4.60 to 5.10 in the combination;
  a particle size of fly ash substitute and aluminium phyllosilicate such that 80% of the particles by volume are less than 1000 μm in size;
  the application of a compacting force to the combination of about 50 to about 90 kgf/cm$^2$;

heat curing of the compacted combination at a temperature of between about 80° C. and 150° C.;
heat curing of the compacted combination for a sufficient time for the heat to fully penetrate the compressed mixture.

34. The geopolymer or geopolymer aggregate according to item 33, comprising all 8 features.

35. The geopolymer or geopolymer aggregate according to any one of items 17 to 34, which is in the form of a geopolymer aggregate consisting of geopolymer.

36. The geopolymer or geopolymer aggregate according to any one of items 17 to 35, having a compressive strength when dry of at least about 20 mPa.

37. The geopolymer or geopolymer aggregate according to any one of items 17 to 36, having a compressive strength after soaking in water of at least about 20 mPa.

38. A method according to producing a geopolymer comprising:
    i) combining fly ash substitute, an aluminium phyllosilicate, an alkaline component and water to form a mixture, wherein the water is present at an amount of about 6% to about 10% by weight of the mixture;
    ii) compacting the mixture by applying pressure; and
    iii) curing the compacted mixture to form the geopolymer.

39. The method according to item 38, comprising compacting the mixture to form a compacted mass, curing the compacted mass to form a geopolymer mass, and breaking the geopolymer mass into geopolymer pieces.

40. The method according to item 38, comprising compacting the mixture to form compacted pieces and curing the compacted pieces to form geopolymer aggregate.

41. The method according to any one of items 38 to 40, wherein the pressure applied is about 50 to about 90 kgf/cm²

42. A method according to producing a geopolymer comprising:
    i) combining fly ash substitute, an aluminium phyllosilicate, an alkaline component and water to form a mixture;
    ii) compacting the mixture by applying pressure of about 50 to about 90 kgf/cm²; and
    iii) curing the compacted mixture to form the geopolymer.

43. The method according to item 42, comprising combining water in the mixture in an amount of about 6% to about 10% by weight.

44. The method according to any one of items 38 to 43, comprising combining fly ash substitute and aluminium phyllosilicate into the mixture in amounts such that the ratio of silicon to aluminium is about 4.60 to about 5.10.

45. The method according to item 44, wherein the ratio is about 4.75 to 4.85.

46. The method according to any one of items 38 to 45, comprising combining, by weight, about 77% to about 84% fly ash substitute, about 4% to about 7% kaolin and about 6% to about 10% alkaline component.

47. The method according to any one of items 38 to 46, comprising heat curing of the compacted mixture.

48. The method according to any one of items 38 to 47, comprising at least 5 of the following features:
    an alkaline component content of between 6% and 10% by weight of the mixture prior to curing;
    an alkaline component content that provides about 1.375-2.1 moles of hydroxide ion per kilogram of the mixture prior to curing;
    an alkaline component concentration in the mixture (as an aqueous solution) of 40% (w/w) to 60% (w/w) prior to curing;
    an atomic ratio of silicon to aluminium between 4.60 to 5.10 in the mixture;
    a particle size of fly ash substitute and aluminium phyllosilicate such that 80% of the particles by volume are less than 1000 µm in size;
    the application of a compacting force to the mixture of about 50 to about 90 kgf/cm²;
    heat curing of the compacted mixture at a temperature of between about 80° C. and 150° C.;
    heat curing the compacted mixture for a at the above stated temperature for sufficient time for the heat to fully penetrate the compressed mixture.

49. The method of item 48, comprising all 8 features.

50. The method according to any one of items 38 to 49, comprising forming a geopolymer having a compressive strength when dry of at least about 20 mPa.

51. The method according to any one of items 38 to 50, comprising forming a geopolymer having a compressive strength after soaking in water of at least about 20 mPa.

52. A geopolymer aggregate produced by the method of any one of items 38 to 51.

53. Use of the geopolymer or geopolymer aggregate according to any one of items 17 to 37 and 52 as a component of concrete.

54. An article comprising the geopolymer or geopolymer aggregate according to any one of items 17 to 37 and 52.

55. The article according to item 54, where in the article is selected from the group consisting of tiles, benchtops, building elements, sheeting, slabs, replacement preformed stone-like materials, roof tiles, tooling moulds (die), concrete, blocks, sheets, bricks and panels.

56. Concrete comprising the geopolymer or geopolymer aggregate according to any one of items 17 to 37 and 52.

57. The concrete of item 56, which is substantially free of crushed rock or stone.

The invention claimed is:

1. A geopolymer composition comprising fly ash or a fly ash substitute, an aluminium phyllosilicate, an alkaline component and water, wherein the water is present at an amount of about 6% to about 10% by weight of the composition and the alkaline component is present at an amount of about 6% to about 10% by weight of the composition and the alkaline component is an alkali metal hydroxide.

2. The geopolymer composition according to claim 1, wherein the water is present at an amount of about 6% to about 8% by weight of the composition.

3. The geopolymer composition according to claim 1, wherein the alkaline component is present as an aqueous solution of a concentration between about 40% (w/w) and 60% (w/w).

4. The geopolymer composition according to claim 1, wherein the alkaline component is present in an amount that provides 1.375-2.1 moles of hydroxide per kilogram of the composition.

5. The geopolymer composition according claim 1, wherein the alkaline component is selected from the group consisting of KOH, NaOH and a mixture thereof.

6. The geopolymer composition according to claim 1, wherein the composition comprises silicon and aluminium in a ratio of about 4.60 to about 5.10.

7. The geopolymer composition according to claim 1, wherein the composition comprises dry powder particles of the fly ash or the fly ash substitute and the aluminium phyllosilicate, and wherein 80% of the dry powder particles by volume are less than 1000 µm in size.

8. The geopolymer composition according to claim 1, wherein the fly ash or the fly ash substitute and the aluminium phyllosilicate have a fineness of between 85% and 99% as measured using AS 3582.1.

9. The geopolymer composition according to claim 1, wherein the geopolymer composition is a geopolymer aggregate composition.

10. The geopolymer composition according to claim 1, wherein the geopolymer composition is substantially free of cement.

11. A geopolymer comprising a cured, compacted combination of fly ash or fly ash substitute, an aluminium phyllosilicate, an alkaline component and water, wherein the water constituted 6% to 10% by weight of the combination prior to curing, the alkaline component is present at an amount of about 6% to about 10% by weight of the combination prior to curing and the geopolymer has a density of at least about 1.40 q/cm$^3$.

12. The geopolymer of claim 11, which is in the form of a geopolymer aggregate.

13. The geopolymer according to claim 11, wherein the alkaline component is present in the combination as an aqueous solution of a concentration between about 40% and 60% prior to curing.

14. The geopolymer according to claim 11, wherein the alkaline component molar concentration in the combination is between about 15M and 23M prior to curing.

15. The geopolymer according to claim 11, wherein the alkaline component is selected from the group consisting of KOH, NaOH and a mixture thereof.

16. The geopolymer according to claim 11, wherein the combination comprises silicon and aluminium in a ratio of about 4.60 to about 5.10.

17. The geopolymer according to claim 11, wherein the combination comprises dry powder particles of the fly ash or the fly ash substitute and the aluminium phyllosilicate, and wherein 80% of the dry powder particles by volume are less than 1000 μm in size, prior to curing.

18. The geopolymer according to claim 11, wherein the fly ash or the fly ash substitute and the aluminium phyllosilicate have a fineness of between 85% and 99% as measured using AS 3582.1, prior to curing.

19. The geopolymer according to claim 11, comprising at least 5 of the following features:
   an alkaline component content that provides about 1.375-2.1 moles of hydroxide ion per kilogram of the combination prior to curing;
   an alkaline component concentration in the combination (as an aqueous solution) of 40% (w/w) to 60% (w/w) prior to curing;
   an atomic ratio of silicon to aluminium between 4.60 to 5.10 in the combination;
   a particle size of fly ash or fly ash substitute, and aluminium phyllosilicate such that 80% of the particles by volume are less than 1000 μm in size;
   the application of a compacting force to the combination of about 50 to about 90 kgf/cm$^2$;
   heat curing of the compacted combination at a temperature of between about 80° C. and 150° C.;
   heat curing of the compacted combination for a sufficient time for the heat to fully penetrate the compressed mixture.

20. The geopolymer according to claim 11, having a compressive strength when dry of at least about 20 mPa.

21. The geopolymer according to claim 11, having a compressive strength after soaking in water of at least about 20 mPa.

22. A method for producing a geopolymer comprising:
   i) combining fly ash or fly ash substitute, an aluminium phyllosilicate, an alkaline component and water to form a mixture, wherein the water is present at an amount of about 6% to about 10% by weight of the mixture and the alkaline component is present at an amount of about 6% to about 10% by weight of the mixture;
   ii) compacting the mixture by applying a pressure, wherein the pressure applied is at least about 50/kgf/cm$^2$; and
   iii) curing the compacted mixture to form the geopolymer.

23. The method according to claim 22, comprising compacting the mixture to form a compacted mass, curing the compacted mass to form a geopolymer mass, and breaking the geopolymer mass into geopolymer pieces.

24. The method according to claim 22, comprising compacting the mixture to form compacted pieces and curing the compacted pieces to form geopolymer aggregate.

25. The method according to claim 22, wherein the application of the compacting force and curing produces a geopolymer having a density of at least 1.4 g/cm$^3$.

26. The method according to claim 22, comprising combining fly ash or fly ash substitute and aluminium phyllosilicate into the mixture in amounts such that the ratio of silicon to aluminium is about 4.60 to about 5.10.

27. The method according to claim 22, comprising heat curing of the compacted mixture.

28. The method according to claim 22, comprising at least 5 of the following features:
   an alkaline component content that provides about 1.375-2.1 moles of hydroxide ion per kilogram of the mixture prior to curing;
   an alkaline component concentration in the mixture (as an aqueous solution) of 40% (w/w) to 60% (w/w) prior to curing;
   an atomic ratio of silicon to aluminium between 4.60 to 5.10 in the mixture;
   a particle size of fly ash or fly ash substitute and aluminium phyllosilicate such that 80% of the particles by volume are less than 1000 μm in size;
   the application of a compacting force to the mixture of about 50 to about 90 kgf/cm$^2$;
   heat curing of the compacted mixture at a temperature of between about 80° C. and 150° C.;
   heat curing the compacted mixture for a sufficient time for the heat to fully penetrate the compacted mixture.

29. The method according to claim 22, comprising forming a geopolymer having a compressive strength when dry of at least about 20 mPa.

30. The method according to claim 22, comprising forming a geopolymer having a compressive strength after soaking in water of at least about 20 mPa.

\* \* \* \* \*